(12) United States Patent
Yamamoto et al.

(10) Patent No.: US 10,277,038 B2
(45) Date of Patent: *Apr. 30, 2019

(54) POWER TRANSMISSION APPARATUS AND WIRELESS POWER TRANSMISSION SYSTEM

(71) Applicant: Panasonic Corporation, Osaka (JP)

(72) Inventors: Atsushi Yamamoto, Kyoto (JP); Hiroshi Kanno, Osaka (JP)

(73) Assignee: PANASONIC CORPORATION, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/657,794

(22) Filed: Jul. 24, 2017

(65) Prior Publication Data

US 2017/0324252 A1    Nov. 9, 2017

Related U.S. Application Data

(63) Continuation of application No. 14/522,240, filed on Oct. 23, 2014, now Pat. No. 9,866,033.

(30) Foreign Application Priority Data

Oct. 28, 2013    (JP) ................................. 2013-223495

(51) Int. Cl.
*H02J 5/00*        (2016.01)
*H01F 38/14*       (2006.01)
(Continued)

(52) U.S. Cl.
CPC ............. *H02J 5/005* (2013.01); *H01F 38/14* (2013.01); *H02J 7/025* (2013.01); *H02J 50/10* (2016.02);
(Continued)

(58) Field of Classification Search
CPC ...................................................... H02J 5/005
See application file for complete search history.

(56) References Cited

U.S. PATENT DOCUMENTS

| 2010/0001845 A1 | 1/2010 | Yamashita |
| 2010/0264746 A1 | 10/2010 | Kazama et al. |

(Continued)

FOREIGN PATENT DOCUMENTS

| CN | 101924400 | 12/2010 |
| CN | 102377217 | 3/2012 |

(Continued)

OTHER PUBLICATIONS

The Extended European Search Report dated Apr. 28, 2015 for the related European Patent Application No. 14189851.0.

(Continued)

*Primary Examiner* — Daniel Kessie
(74) *Attorney, Agent, or Firm* — Wenderoth, Lind & Ponack, L.L.P.

(57) ABSTRACT

A power transmission apparatus includes the following elements. A position detection coil detects a signal from a power reception coil of a power reception apparatus installed on an installation surface. A position detection circuit determines from the detected signal that the power reception apparatus is installed on the installation surface. A reception circuit receives a wireless signal transmitted from the power reception apparatus via the position detection coil. A switch circuit switches electrical connection of the position detection coil between the position detection circuit and the reception circuit. A power transmission control circuit switches electrical connection of the position detection coil from the position detection circuit to the reception circuit if it is determined that a voltage or a current of the detected signal has been smaller than a reference value for a prede- (Continued)

termined period, and causes the reception circuit to receive the wireless signal via the position detection coil.

7 Claims, 19 Drawing Sheets

(51) Int. Cl.
| | |
|---|---|
| *H02J 50/12* | (2016.01) |
| *H02J 7/02* | (2016.01) |
| *H02J 50/60* | (2016.01) |
| *H02J 50/10* | (2016.01) |
| *H02J 50/40* | (2016.01) |
| *H02J 50/90* | (2016.01) |
| *H02J 50/80* | (2016.01) |
| *H02J 7/00* | (2006.01) |

(52) U.S. Cl.
CPC ............. *H02J 50/12* (2016.02); *H02J 50/40* (2016.02); *H02J 50/60* (2016.02); *H02J 50/80* (2016.02); *H02J 50/90* (2016.02); *H02J 7/0042* (2013.01)

(56) References Cited

U.S. PATENT DOCUMENTS

| | | |
|---|---|---|
| 2010/0270970 A1 | 10/2010 | Toya et al. |
| 2010/0315039 A1 | 12/2010 | Terao et al. |
| 2012/0043931 A1 | 2/2012 | Terao et al. |
| 2012/0146580 A1 | 6/2012 | Kitamura |
| 2012/0323423 A1 | 12/2012 | Nakamura et al. |
| 2013/0207468 A1 | 8/2013 | Wu |
| 2014/0070765 A1 | 3/2014 | Hasegawa et al. |
| 2014/0091641 A1 | 4/2014 | Ichikawa |

FOREIGN PATENT DOCUMENTS

| | | |
|---|---|---|
| CN | 102791517 | 11/2012 |
| JP | 2010-239781 | 10/2010 |
| JP | 2012-105477 | 5/2012 |
| JP | 2010-016985 | 1/2019 |
| WO | 2008/032746 | 3/2008 |
| WO | 2012/081519 | 6/2012 |
| WO | 2012/164744 | 12/2012 |
| WO | 2013/128815 | 9/2013 |

OTHER PUBLICATIONS

English translation of the Search Report dated Apr. 25, 2016 in related Chinese Patent Application No. 201410569448.5.

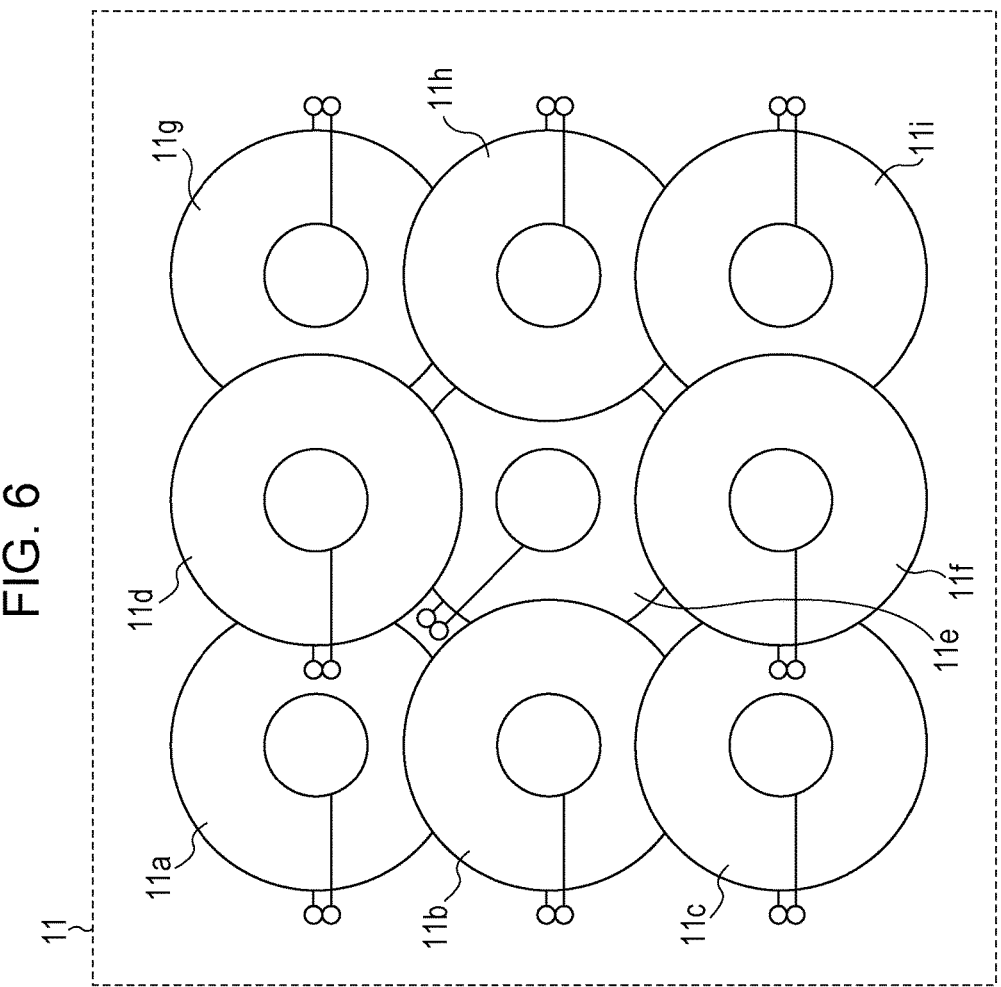
FIG. 6
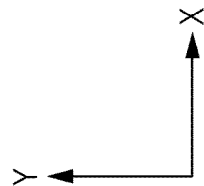

POWER TRANSMISSION APPARATUS AND WIRELESS POWER TRANSMISSION SYSTEM

BACKGROUND

1. Technical Field

The present disclosure relates to a power transmission apparatus and a wireless power transmission system that send AC power in a non-contact manner by utilizing electromagnetic induction between a power transmission coil and a power reception coil.

2. Description of the Related Art

These days, various mobile devices, for example, cell phones, are becoming widespread, and power consumption in mobile devices is increasing due to their enhanced functions and performance and an increase in the variety of the content. If power consumption in a mobile device operating with a limited capacity of batteries increases, the operating time of the mobile device decreases. As a technology for compensating for a limited capacity of batteries, a wireless power transmission system is attracting a lot of attention. A wireless power transmission system sends AC power in a non-contact manner from a power transmission apparatus to a power reception apparatus by utilizing electromagnetic induction between a power transmission coil of the power transmission apparatus and a power reception coil of the power reception apparatus. Particularly in a wireless power transmission system using a resonance-type power transmission coil and power reception coil, high transmission efficiency can be maintained even when the power transmission coil and the power reception coil are displaced from each other. Accordingly, the application of such a wireless power transmission system in various fields is being expected.

In a wireless power transmission system, when charging batteries, the optimal voltage and current to be applied to the batteries changes over time in accordance with the amount of charged energy. While the batteries are being charged, the temperature of the batteries may rise, in which case, it is necessary to reduce the amount by which the batteries are charged. In this manner, in the case of battery charging, for performing optimal power transmission, it is necessary to provide feedback of temperature information and charge amount information, as well as information concerning a desired voltage and current, from a power reception apparatus to a power transmission apparatus.

Examples of the above-described related art are disclosed in Japanese Unexamined Patent Application Publication No. 2010-16985 and International Publication Nos. 2012/081519 and 2012/164744 pamphlets.

SUMMARY

In the above-described related art, however, a power transmission apparatus that receives communication from a power reception apparatus more reliably is still demanded.

A power transmission apparatus according to one aspect of the present disclosure is a power transmission apparatus for transmitting power to a power reception apparatus including a power reception coil in a non-contact manner. The power transmission apparatus includes: a power transmission coil that is disposed opposite an installation surface of the power transmission apparatus on which the power reception apparatus is installed and that is capable of being electromagnetically coupled with the power reception coil; at least one position detection coil that is disposed between the installation surface and the power transmission coil and that detects a signal from the power reception coil of the power reception apparatus installed on the installation surface; a position detection circuit that determines that the power reception apparatus is installed on the installation surface if a voltage or a current of the signal detected via the at least one position detection coil is smaller than a reference value; a reception circuit that demodulates a wireless signal transmitted from the power reception apparatus to the power transmission apparatus via the at least one position detection coil into a data signal; a switch circuit that switches between electrical connection between the at least one position detection coil and the position detection circuit, and electrical connection between the at least one position detection coil and the reception circuit; and a power transmission control circuit that switches electrical connection of the at least one position detection coil from the position detection circuit to the reception circuit if the position detection circuit has determined that the voltage or the current of the signal detected via the at least one position detection coil has been smaller than the reference value for a predetermined period, and that causes the reception circuit to receive the wireless signal via the at least one position detection coil.

According to the above-described aspect, it is possible to provide a power transmission apparatus that receives communication from a power reception apparatus more reliably.

The general and specific aspect may be implemented by using a system, a method, an integrated circuit, a computer program, or a recording medium, or may be implemented by any combination of a system, an apparatus, a method, an integrated circuit, a computer program, and a recording medium.

BRIEF DESCRIPTION OF THE DRAWINGS

FIG. 6 is a top view illustrating an example of the configuration of the power transmission coil shown in FIG. 1;

DETAILED DESCRIPTION

Findings Based on the Disclosure

Figure 1:
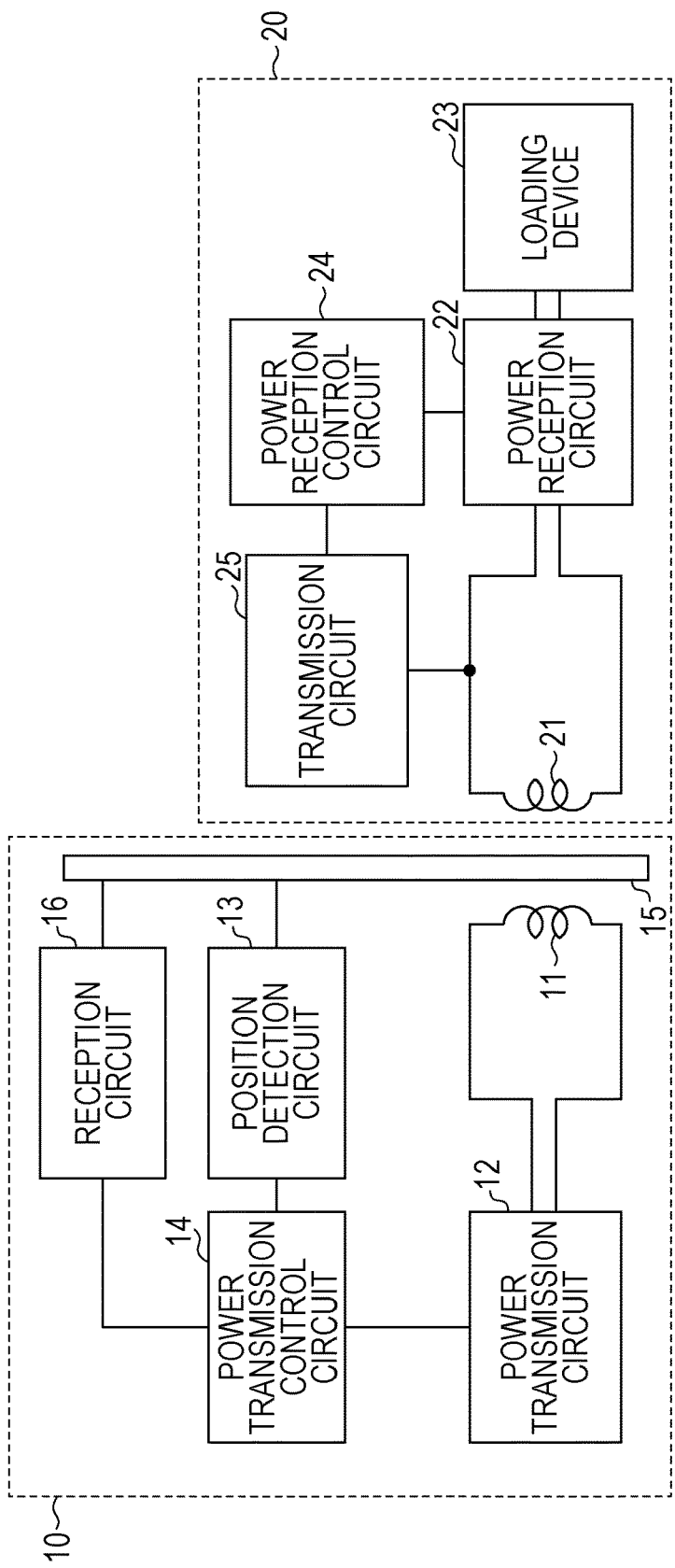
FIG. 1 is a block diagram illustrating an example of the configuration of a wireless power transmission system according to a first embodiment.

The inventors of this disclosure have found that the wireless power transmission systems discussed above present the following problems.

Japanese Unexamined Patent Application Publication No. 2010-16985 discloses a method for sending information from a power reception apparatus to a power transmission apparatus in a non-contact power transmission system. In this method, the power transmission apparatus transmits power to the power reception apparatus via a power transmission coil of the power transmission apparatus, and receives information from a power reception coil of the power reception apparatus via the power transmission coil. This publication does not disclose the provision of a position detection coil used for detecting that the power reception apparatus is installed on an installation surface of the power transmission apparatus.

International Publication No. 2012/081519 pamphlet discloses a method for sending information from a power reception apparatus to a power transmission apparatus in a non-contact power transmission system. This power transmission apparatus includes a position detection coil, and receives information from the power reception apparatus after precisely aligning the position of a power transmission coil of the power transmission apparatus to a power reception coil of the power reception apparatus.

In International Publication No. 2012/164744 pamphlet, a power transmission apparatus and a power reception apparatus each include a communication device, which is provided separately from a power transmission coil and a power reception coil, respectively, and send and receive information by using a second frequency, which is different from a first frequency used for transmitting power. The second frequency is not an integral multiple of the first frequency.

In the method disclosed in Japanese Unexamined Patent Application Publication No. 2010-16985, in the power reception apparatus, the resistance of a load connected to the power reception coil is changed, and a voltage change of power transmitted from the power transmission coil in response to a change in the resistance of the load is detected. The power reception apparatus then sends information indicating the results of detecting the voltage change to the power transmission coil via the power reception coil. In this case, if the power transmission coil and the power reception coil are separated from each other or if they are displaced from each other, a coupling force between the power transmission coil and the power reception coil is decreased. Accordingly, the intensity of a signal reaching the power transmission apparatus from the power reception apparatus is decreased, and as a result, correct information communication may not be able to be performed.

In the above-described power transmission apparatus, the power transmission coil is connected to a power supply circuit which converts DC power input from an external DC power supply source into AC power having a predetermined frequency and which supplies AC power to the power transmission coil. Accordingly, the above-described information is superimposed as a temporal change in the amplitude of an AC voltage supplied from the power supply circuit. Thus, the information is vulnerable to the influence of noise from the power supply circuit.

Additionally, in comparison with the regular amplitude of the AC voltage, a temporal change in the amplitude for sending this information is very small. Accordingly, the above-described information signal is indistinguishable from noise of the AC voltage, and as a result, correct information communication may not be able to be performed.

The above-described problems may arise from the fact that receiving of low-power information from the power reception coil and transmitting of high AC power are performed at the same time by using the same power transmission coil.

In the method disclosed in International Publication No. 2012/081519 pamphlet, the power transmission apparatus includes a position detection coil, which enables precise alignment of the position of the power transmission coil of the power transmission apparatus to the power reception coil of the power reception apparatus, thereby suppressing a decrease in the signal intensity. On the other hand, however, the provision of a position detection coil between the power transmission apparatus and the power reception apparatus increases the distance therebetween. Additionally, the position detection coil, which is made of a conductor, decreases the intensity of a signal reaching the power transmission apparatus, and as a result, correct information communication may not be able to be performed.

The above-described problems may arise due to the following reasons. The provision of a position detection coil increases the distance between the power transmission apparatus and the power reception apparatus, thereby decreasing the signal intensity. Moreover, when sending a signal from the power reception apparatus to the power transmission apparatus, the position detection coil made of a conductor serves as an attenuation filter, thereby decreasing the signal intensity.

In International Publication No. 2012/164744 pamphlet, the power transmission apparatus and the power reception apparatus each include a communication device, which is provided separately from the power transmission coil and the power reception coil, respectively, and send and receive information by using a second frequency, which is different from a first frequency used for transmitting power and which is not an integral multiple of the first frequency, thereby improving the reliability of information communication. With this configuration, however, a new component, which is a communication device, such as an oscillator that generates a frequency different from a transmission frequency, has to be added to both of the power transmission apparatus and the power reception apparatus. These days, as mobile devices, small, thin, low-cost power transmission apparatuses and power reception apparatuses are demanded. It is thus difficult to add a communication device to a power transmission apparatus and a power reception apparatus.

As discussed above, none of the above-described three publications disclose that information sent from a power reception coil of a power reception apparatus to a power transmission apparatus is received via a position detection coil which is used for detecting that the power reception apparatus is installed on the installation surface of the power transmission apparatus. Accordingly, a small, thin power transmission apparatus of a wireless power transmission system in which communication from a power reception apparatus to the power transmission apparatus is reliably performed is not provided.

Thus, a small, thin power transmission apparatus that can reliably receive communication from a power reception apparatus is still demanded.

In view of the above background, the present inventors have conceived the following aspects of the disclosure.

A power transmission apparatus according to one aspect of the disclosure is a power transmission apparatus for transmitting power to a power reception apparatus including a power reception coil in a non-contact manner. The power transmission apparatus includes: a power transmission coil that is disposed opposite an installation surface of the power transmission apparatus on which the power reception apparatus is installed and that is capable of being electromagnetically coupled with the power reception coil; at least one position detection coil that is disposed between the installation surface and the power transmission coil and that detects a signal from the power reception coil of the power reception apparatus installed on the installation surface; a position detection circuit that determines that the power reception apparatus is installed on the installation surface if a voltage or a current of the signal detected via the at least one position detection coil is smaller than a reference value; a reception circuit that demodulates into a data signal a wireless signal transmitted from the power reception apparatus to the power transmission apparatus via the at least one position detection coil; a switch circuit that switches between electrical connection between the at least one position detection coil and the position detection circuit, and electrical connection between the at least one position detection coil and the reception circuit; and a power transmission control circuit that switches electrical connection of the at least one position detection coil from the position detection circuit to the reception circuit if the position detection circuit has determined that the voltage or the current of the signal detected via the at least one position detection coil has been smaller than the reference value for a predetermined period, and that causes the reception circuit to receive the wireless signal via the at least one position detection coil.

According to the above-described aspect, the power transmission apparatus receives the above-described apparatus information and number-and-position information from the power reception apparatus via the position detection coil used for detecting that the power reception apparatus is installed on the installation surface of the power transmission apparatus. Accordingly, when receiving the apparatus information and number-and-position information, the power transmission apparatus uses the position detection coil instead of using the power transmission coil for transmitting high AC power. As a result, it is possible to suppress a decrease in the signal intensity, compared with when the transmission coil is used for receiving the apparatus information and number-and-position information.

When receiving the apparatus information and number-and-position information, the power transmission apparatus uses the position detection coil instead of using the power transmission coil for transmitting high AC power. Accordingly, the apparatus information and number-and-position information received from the power reception apparatus is distinguishable from noise of power transmitted from the power transmission apparatus.

An existing component, that is, the position detection coil used for detecting that the power reception apparatus is installed on the installation surface of the power transmission apparatus, is used without adding a new communication device, thereby reducing the size and the thickness of the power transmission apparatus and the power reception apparatus.

It is thus possible to provide a small, thin power transmission apparatus that receives communication from a power reception apparatus more reliably.

A power transmission apparatus according to another aspect of the disclosure is a power transmission apparatus for transmitting power to one or more power reception apparatuses each including a power reception coil in a non-contact manner. The power transmission apparatus includes: a power transmission coil that is disposed opposite an installation surface of the power transmission apparatus on which the one or more power reception apparatuses are installed and that is capable of being electromagnetically coupled with the power reception coil; a plurality of position detection coils that are disposed side by side between the installation surface and the power transmission coil, and that detect each signal from each the power reception coil included in the one or more power reception apparatuses installed on the installation surface; a position detection circuit that receives, from each of the plurality of position detection coils, voltages or currents of the signals detected by the plurality of each of position detection coils; a power transmission control circuit that determines a position of the one or more power reception apparatuses installed on the installation surface by comparing the voltages or the currents of the signals; a reception circuit that demodulates into a data signal a wireless signal transmitted from the one or more power reception apparatuses to the power transmission apparatus and that outputs the data signal to the power transmission control circuit; and a switch circuit that switches between electrical connection between each of the plurality of position detection coils and the position detection circuit, and electrical connection between each of the plurality of position detection coils and the reception circuit. If the power transmission control circuit determines that the one or more power reception apparatuses are installed at the determined position of the one or more power reception apparatuses installed on the installation surface for a predetermined time, the power transmission control circuit switches the electrical connection of a position detection coil corresponding to the determined position of the one or more power reception apparatuses from the position detection circuit to the reception circuit, and causes the reception circuit to receive the wireless signal via the position detection coil.

According to the above-described aspect, the power transmission apparatus receives the above-described apparatus information and number-and-position information from the power reception apparatus via the position detection coil used for detecting that the one or more power reception apparatuses are installed on the installation surface of the power transmission apparatus. Accordingly, when receiving the apparatus information and number-and-position information, the power transmission apparatus uses the position detection coil instead of using the power transmission coil for transmitting high AC power. As a result, it is possible to suppress a decrease in the signal intensity, compared with when the transmission coil is used when receiving the apparatus information and number-and-position information.

The apparatus information and number-and-position information is received by using, from among the plurality of position detection coils, a position detection coil corresponding to the position of the power reception apparatus installed on the installation surface. Accordingly, since the apparatus information and number-and-position information is received by using the position detection coil which will receive the highest signal intensity among the plurality of position detection coils, correct information reception is implemented.

An existing component, that is, the position detection coils used for detecting that the one or more power reception apparatuses are installed on the installation surface of the power transmission apparatus, is used without adding a new communication device, thereby reducing the size and the thickness of the power transmission apparatus and the one or more power reception apparatuses.

Embodiments of the present disclosure will be described below with reference to the accompanying drawings. In the following embodiments, the same or similar components are designated by like reference numerals.

First Embodiment

A wireless power transmission system according to a first embodiment of the present disclosure will be described below with reference to the drawings.

Figure 2:
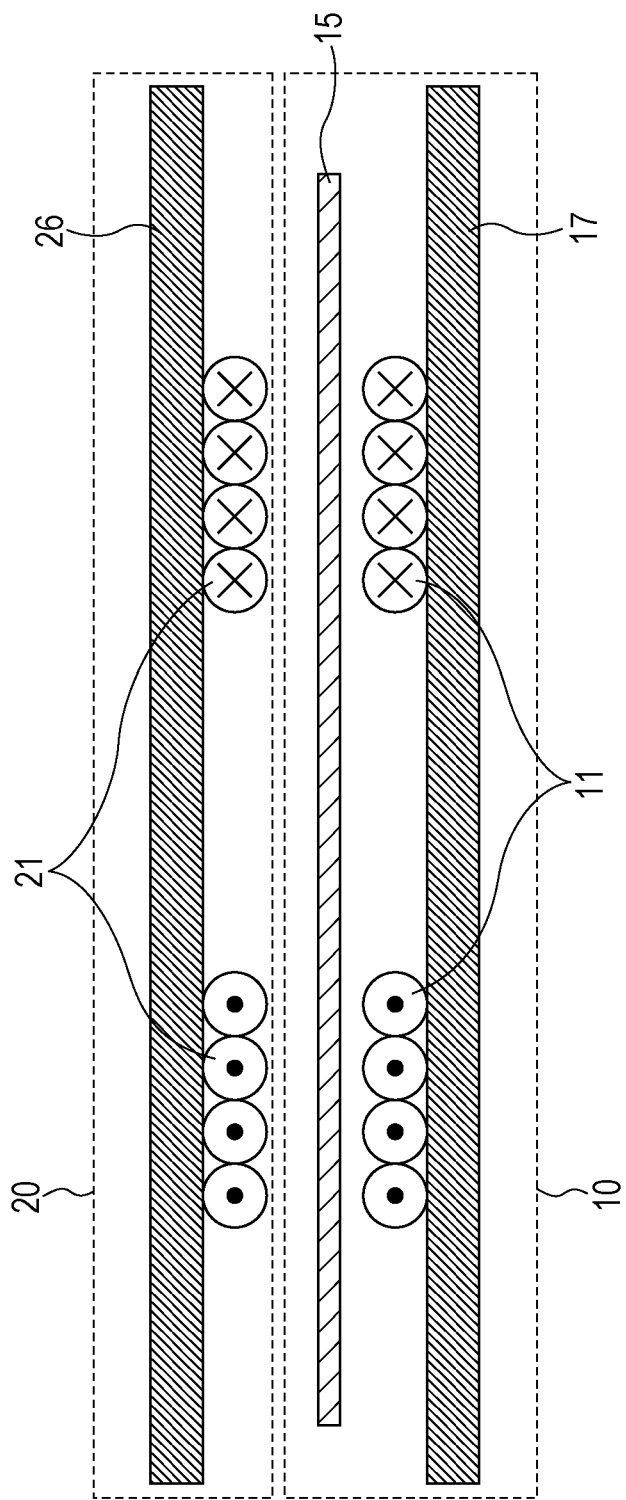
FIG. 2 is a longitudinal cross-sectional view illustrating the arrangement of a power transmission coil and a power reception coil shown in FIG. 1.

FIG. 1 is a block diagram illustrating an example of the configuration of a wireless power transmission system of the first embodiment. FIG. 2 is a longitudinal cross-sectional view illustrating the arrangement of a power transmission coil 11 and a power reception coil 21 shown in FIG. 1. That is, FIG. 2 illustrates the positional relationships between a power transmission apparatus 10 and a power reception apparatus 20 and between the power transmission coil 11 and the power reception coil 21. The wireless power transmission system of the first embodiment includes the power transmission apparatus 10 and the power reception apparatus 20, and transmits AC power from the power transmission apparatus 10 to the power reception apparatus 20 in a non-contact manner. The power transmission apparatus 10 includes, as shown in FIG. 1, the power transmission coil 11, a power transmission circuit 12, a position detection circuit 13, a power transmission control circuit 14, a position detection coil 15, and a reception circuit 16. The power reception apparatus 20 includes, as shown in FIG. 1, the power reception coil 21, a power reception circuit 22, a loading device 23, a power reception control circuit 24, and a transmission circuit 25.

In FIG. 1, the power transmission circuit 12 receives DC or AC power supply from a power supply device (not shown), and supplies AC power to the power transmission coil 11. In this case, the power transmission circuit 12 generates AC power having a frequency (transmission frequency) at which AC power can pass from the power transmission coil 11 to the power reception coil 21. Generally, the power transmission coil 11 has a resonant frequency equal to the frequency of AC power so that AC power can pass through the power transmission coil 11. However, as long as AC power can pass through the power transmission coil 11, it is not necessary that the resonant frequency of the power transmission coil 11 be equal to the frequency of AC power. Similarly, the power reception coil 21 has a resonant frequency equal to the frequency of AC power so that AC power can pass through the power reception coil 21. However, as long as AC power can pass through the power reception coil 21, it is not necessary that the resonant frequency of the power reception coil 21 be equal to the frequency of AC power.

When the power reception apparatus 20 is disposed opposite the power transmission apparatus 10, as shown in FIG. 2, the power reception coil 21 can be electromagnetically coupled with the power transmission coil 11, thereby implementing non-contact power transmission. However, if the power reception coil 21 does not oppose the power transmission coil 11, that is, if the power transmission coil 11 and the power reception coil 21 are displaced from each other, a coupling force therebetween is decreased, thereby failing to efficiently transmit power. Accordingly, the position detection coil 15 is interposed between the power reception coil 21 and the power transmission coil 11 so that the position of the power reception coil 21 and that of the power transmission coil 11 may be aligned to each other (see, for example, International Publication No. 2012/081519 pamphlet). In this case, the position detection circuit 13 supplies detection pulses to the position detection coil 15, and a voltage or a current of a signal reflected by and returned from the power reception coil 21 of the reception apparatus 20 is detected, thereby detecting the position of the power reception coil 21. As shown in FIG. 2, in order to detect the accurate position of the power reception coil 21, the position detection coil 15 is disposed along a surface on which the power transmission apparatus 10 opposes the power reception apparatus 20 and in an area or at a position closer to the power reception apparatus 20 than to the power transmission coil 11.

As shown in FIG. 2, the power transmission coil 11 and the power reception coil 21 include magnetic members 17 and 26, respectively, so that a magnetic field generated between the power transmission coil 11 and the power reception coil 21 can be sealed while power transmission is being performed, thereby reducing the influence from outside. Accordingly, power can be efficiently transmitted without being influenced by the surrounding environment.

Figure 3:
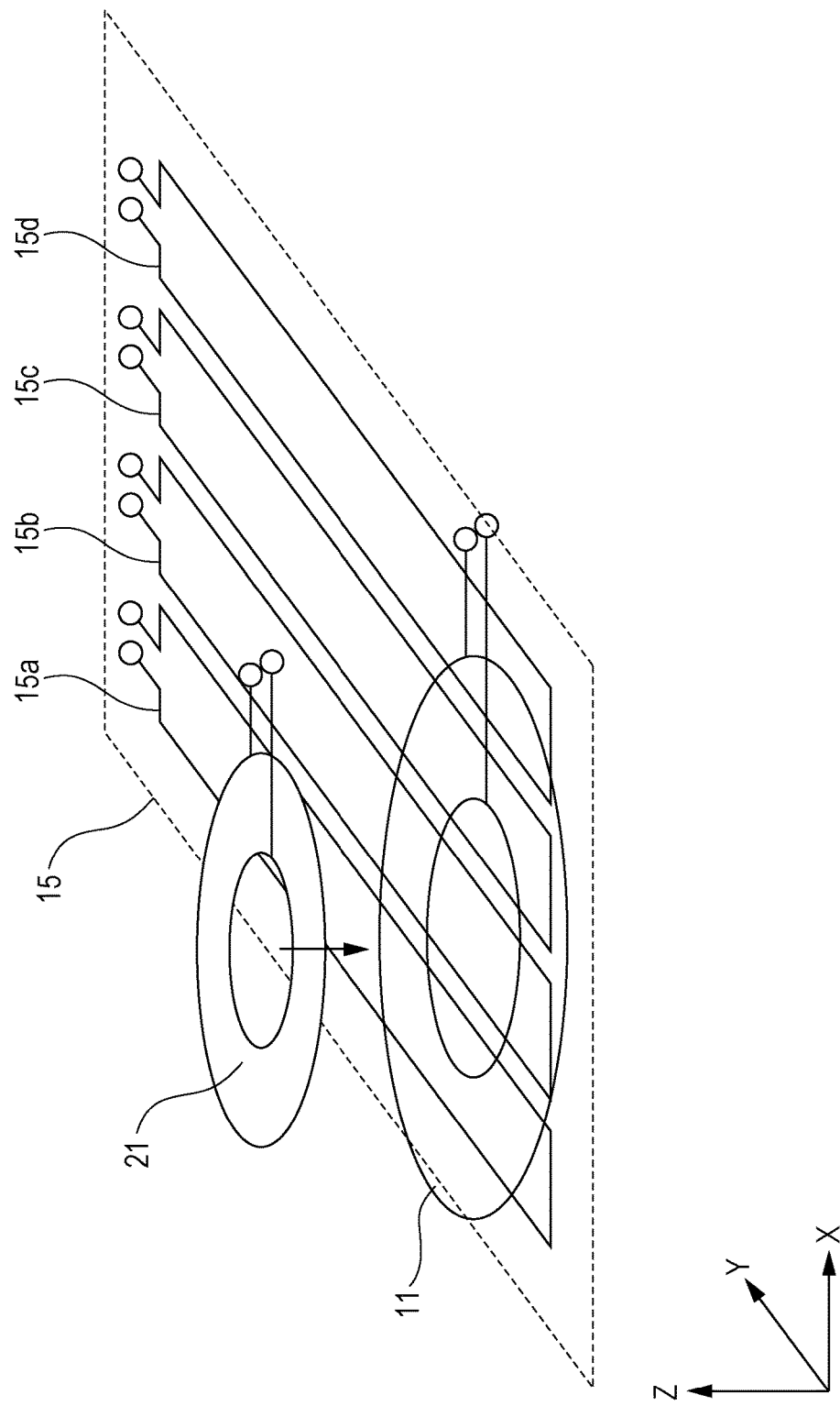
FIG. 3 is a perspective view illustrating an example of the configuration of the power transmission coil, the power reception coil, and a position detection coil shown in FIG. 1.

FIG. 3 is a perspective view illustrating an example of the configuration of the power transmission coil 11, the power reception coil 21, and the position detection coil 15 shown in FIG. 1. The position detection coil 15 shown in FIG. 3 includes four one-turn position detection coil elements 15a through 15d extending in a longitudinal direction parallel with the Y direction and disposed at equal intervals in parallel with each other in the X direction. The operation for detecting the position of the power reception apparatus 20 will be described below on the basis of the configuration of the position detection coil 15 shown in FIG. 3 by way of example.

First, detection pulses (signal) are sent from the position detection circuit 13 to the position detection coil element 15a. Then, a voltage or a current of a signal reflected by and returned from the power reception coil 21 is detected, and the intensity of the detected voltage or current is stored in a memory of the position detection circuit 13. Hereinafter, detection pulses will be simply referred to as a "signal". Then, a signal is sent from the position detection circuit 13 to the position detection coil element 15b. Then, a voltage or a current of a signal reflected by and returned from the power reception coil 21 is similarly detected, and the intensity of the detected voltage or current (hereinafter referred to as the "reflection intensity") is stored in the memory of the position detection circuit 13. Similarly, this operation is sequentially repeated for the position detection coil elements 15c and 15d. Then, the reflection intensities of signals returned from the power reception coil 21 as a result of sending signals to the position detection coil elements 15a through 15d and stored in the memory of the position detection circuit 13 are compared with each other. As a result of this comparison, if energy is consumed in the power reception coil 21 or the power reception circuit 22 due to electromagnetic coupling between the power transmission coil 11 and the power reception coil 21, the position detection circuit 13 determines that the power reception coil 21 is located closest to a position detection coil element that has received a signal of the lowest reflection intensity returned from the power reception coil 21.

An alternative method for detecting the position of the power reception apparatus 20 is as follows. A voltage or a current of a signal reflected by and returned from a power reception coil sufficiently separated from the position detection coil elements 15a through 15d is determined to be a reference value. Then, when the difference between this reference value and a voltage or a current of a signal reflected by and received from the power reception coil 21 by a certain position detection coil element exceeds a predetermined threshold, the position detection circuit 13 determines that the power reception coil 21 is located near this position detection coil element.

The power transmission control circuit 14 determines the position of the power reception apparatus 20 installed on the installation surface of the power transmission apparatus 10 on the basis of the reflection intensity of each of the received signals.

In order to improve the precision in determining the position of the power reception apparatus 20, the following method may be employed. A position detection coil element that has received the highest reflection intensity signal returned from the power reception coil 21 is first selected. Then, the position detection coil element located closest to the power reception coil 21 is estimated by using, not only the highest reflection intensity signal, but also reflection intensity signals received by plural position detection coil elements located near the selected position detection coil element. However, details of such a method are not given here. In the example shown in FIG. 3, it is assumed that the position detection coil element 15a is positioned closest to the power reception coil 21 and receives the highest reflection intensity signal and that the position detection circuit 13 determines that the power reception coil 21 is located closest to the position detection coil element 15a in the X direction.

For the sake of description, in FIG. 3, a method for detecting the position of the power reception apparatus 20 in the X direction by using the position detection coil elements 15a through 15d extending in a longitudinal direction parallel with the Y direction and disposed in parallel with each other in the X direction has been discussed by way of example. However, the present disclosure is not restricted to this method, and another method for detecting the position of the power reception apparatus 20 may be employed, which will be discussed with reference to FIG. 4.

Figure 4:
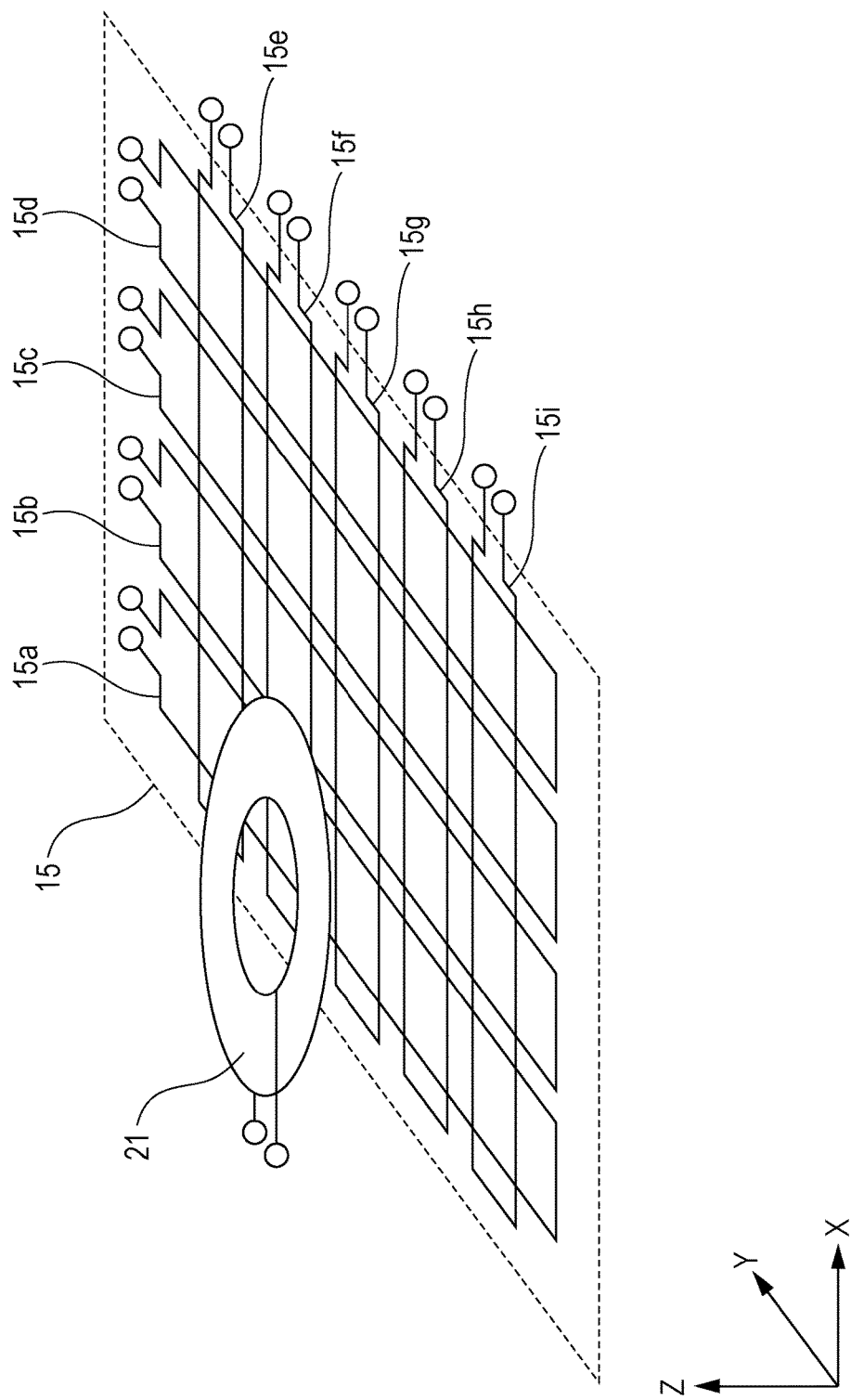
FIG. 4 is a perspective view illustrating an example of the configuration of the power reception coil and the position detection coil, which is a modified example of the configuration shown in FIG. 3.

FIG. 4 is a perspective view illustrating an example of the configuration of the power reception coil 21 and the position detection coil 15. FIG. 4 illustrates a modified example of the configuration shown in FIG. 3. As shown in FIG. 4, in addition to the position detection coil elements 15a through 15d, a plurality of position detection coil elements 15e through 15i extending in a longitudinal direction parallel with the X direction and disposed in parallel with each other in the Y direction are provided so that they can detect the position of the power reception apparatus 20 in the Y direction. With this configuration, the position of the power reception coil 21 can be detected in the two-dimensional (XY) direction. The power transmission coil 11 is not necessary for a description of the method, and thus, it is not shown in FIG. 4. In the configuration shown in FIG. 4, the position of the power reception coil 21 can be detected two-dimensionally by first checking the reflection intensities received by the position detection coil elements 15a through 15d arranged in the X direction and then by checking the reflection intensities received by the position detection coil elements 15e through 15i arranged in the Y direction.

In the configuration shown in FIG. 4, the four position detection coil elements 15a through 15d are arranged in the X direction, and the five position detection coil elements 15e through 15i are arranged in the Y direction. However, the present disclosure is not restricted to this configuration, and the number of position detection coil elements 15a through 15d and the number of position detection coil elements 15e through 15i may be changed depending on a range in which the position of the power reception coil 21 is detected. In FIGS. 3 and 4, the position detection coil elements 15a through 15i are constituted by one-turn coils. However, the number of turns is not restricted to one, and the position detection coil elements 15a through 15i may be constituted by coils having two or more turns. By increasing the number of turns, the coupling force between the power reception coil 21 and the power transmission coil 11 can be intensified, thereby further increasing the reflection intensity. In FIGS. 3 and 4, the position detection coil elements 15a through 15i are formed substantially in a rectangular shape. However, the shape of the position detection coil elements 15a through 15i is not restricted, and may be formed in another shape, such as a square, circular, oblong, or elliptical shape.

Figure 5:
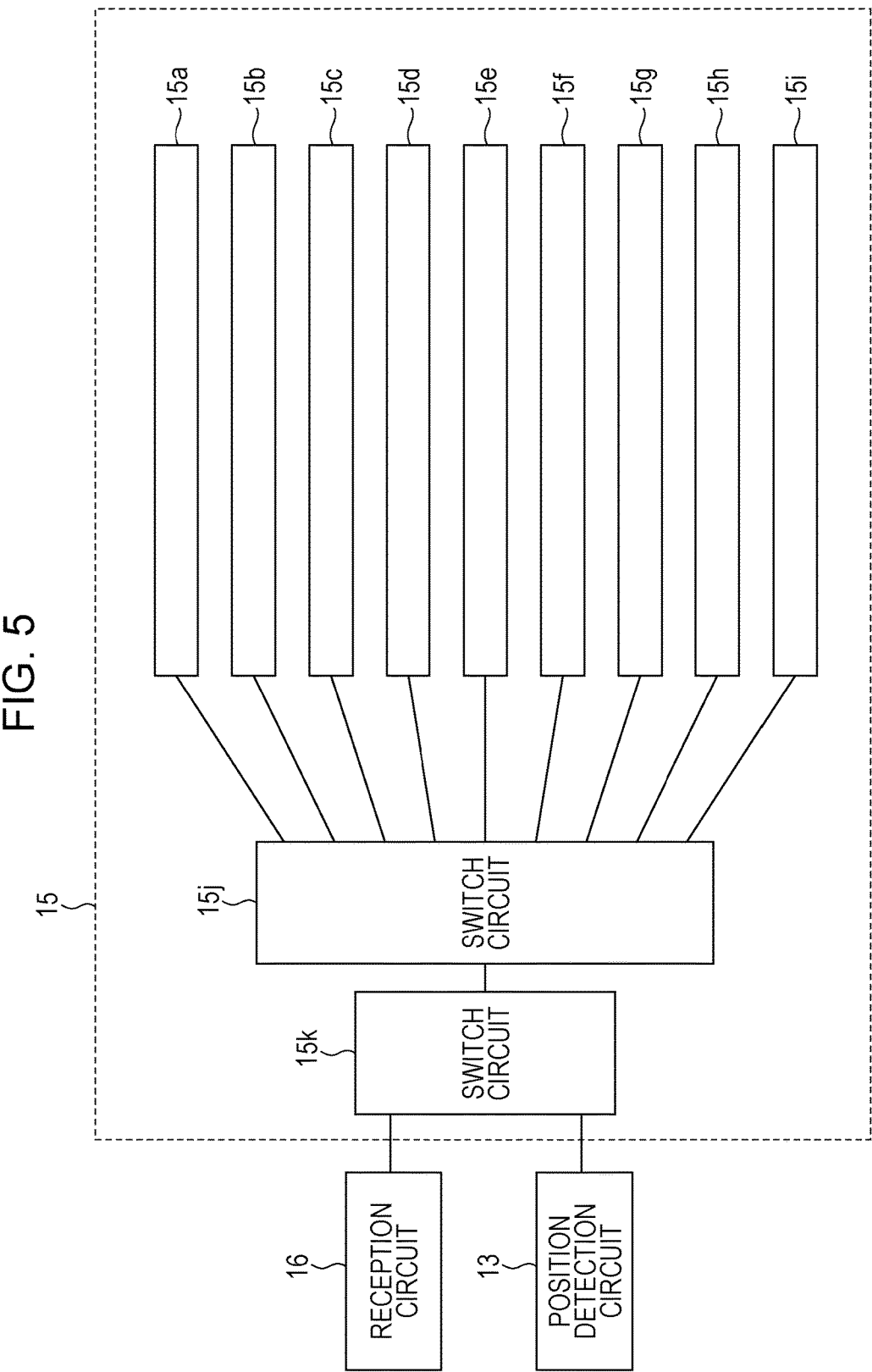
FIG. 5 is a block diagram of the circuitry configuration of the position detection coil shown in FIG. 1.

FIG. 5 is a block diagram of the circuitry configuration of the position detection coil 15 shown in FIG. 1. In FIG. 5, the connection between the position detection coil 15 and each of the position detection circuit 13 and the reception circuit 16 is shown. The circuitry of the position detection coil 15 includes, as shown in FIG. 5, switch circuits 15k and 15j and the position detection coil elements 15a through 15i (may be simply referred to as the "position detection coil 15"). The switch circuit 15k selects one of the position detection circuit 13 and the reception circuit 16 and connects the selected circuit to the switch circuit 15j. The switch circuit 15j selects one of the position detection coil elements 15a through 15*j* and connects the selected coil element to the switch circuit 15*k*. The switching operations of the switch circuits 15*k* and 15*j* are controlled by the power transmission control circuit 14. In this case, the power transmission control circuit 14 may directly control the switch circuits 15*k* and 15*j* by using a control signal. In this manner, control can be performed with the simplest configuration, but this is only an example. Alternatively, the power transmission control circuit 14 may control the position detection circuit 13 and the reception circuit 16 so that the switch circuits 15*k* and 15*j* will be controlled by control signals supplied from the position detection circuit 13 and the reception circuit 16. With this configuration, it is not necessary to provide synchronization between each of the position detection circuit 13 and the reception circuit 16 and the switch circuits 15*k* and 15*j*, and thus, high-precision control does not have to be performed.

In the first embodiment, the switch circuit 15*j* selects, from among the position detection coil elements 15*a* through 15*i*, the position detection coil element that has received the lowest reflection intensity signal from the power reception coil 21. In another example, the switch circuit 15*j* may select the position detection coil element that has received the highest reflection intensity signal from the power reception coil 21.

Figure 19A:
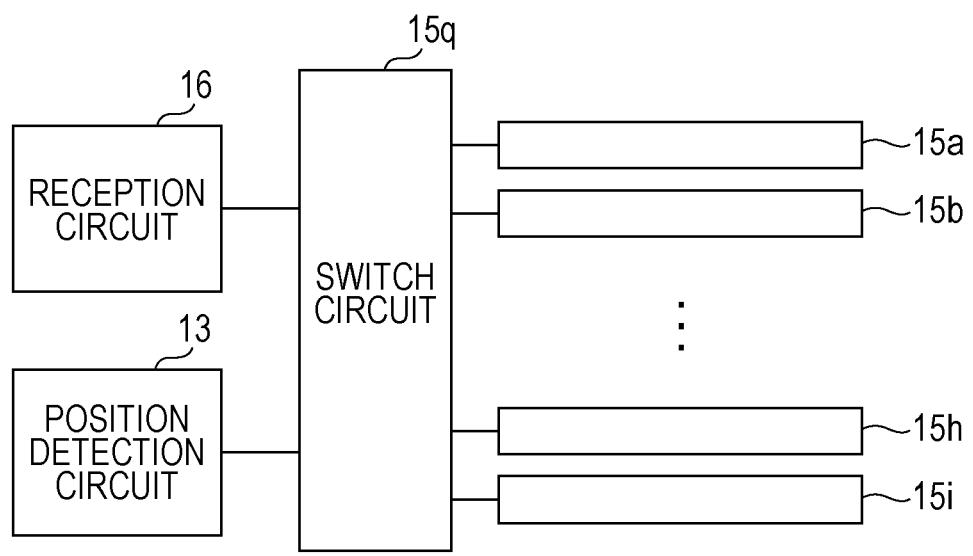
FIGS. 19A and 19B are block diagrams illustrating other examples of the circuitry configurations of the position detection coil shown in FIG. 5.

In an alternative configuration of the position detection coil 15, as shown in FIG. 19A, instead of selecting a position detection coil element, all of the position detection coil elements 15*a* through 15*i* may be connected to a switch circuit 15*q*, and a wireless signal from the power reception apparatus 20 may be obtained via one of the position detection coil elements 15*a* through 15*i*. In this case, a determination as to whether or not the power reception apparatus 20 is installed on the installation surface of the power transmission apparatus 10 is made by detecting a signal from the power reception apparatus 20 via the position detection coil 15. More specifically, if the intensity of a signal returned from the power reception apparatus 20 in response to a signal input from the position detection circuit 13 is maintained within a certain range for a predetermined period, the power transmission control circuit 14 determines that the power reception apparatus 20 is installed on the installation surface of the power transmission apparatus 10. In this case, by using the switch circuit 15*q*, the power transmission control circuit 14 switches the electrical connection of all of the position detection coil elements 15*a* through 15*i* from the position detection circuit 13 to the reception circuit 16. Then, the power transmission control circuit 14 causes the reception circuit 16 to receive a wireless signal through the position detection coil 15.

Figure 19B:
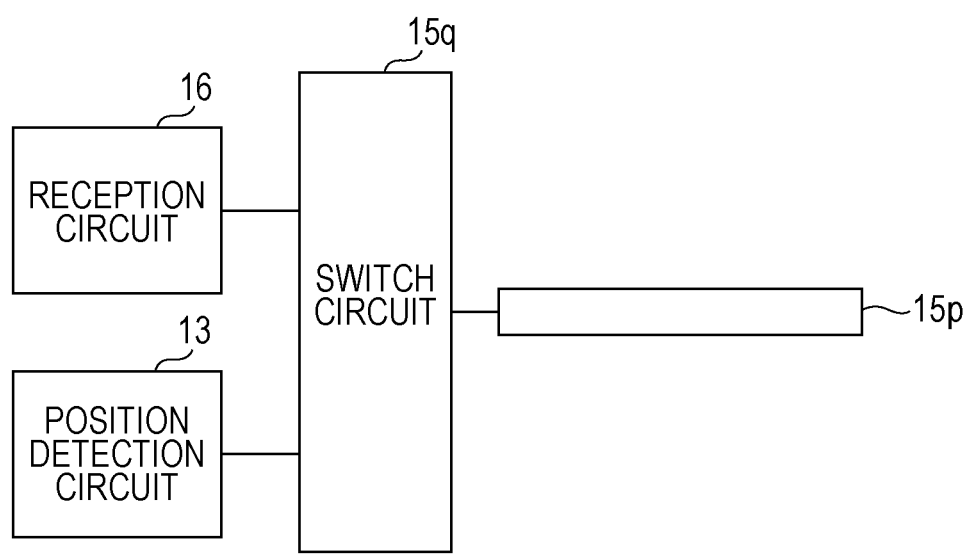

In the first embodiment, the plurality of position detection coil elements 15*a* through 15*i* are used. However, as shown in FIG. 19B, one position detection coil 15*p* may be used. In this case, a determination as to whether or not the power reception apparatus 20 is installed on the installation surface of the power transmission apparatus 10 is made by detecting a signal from the power reception apparatus 20 via the position detection coil 15*p*. More specifically, if the intensity of a signal returned from the power reception apparatus 20 in response to a signal input from the position detection circuit 13 is maintained within a certain range for a predetermined period, the power transmission control circuit 14 switches the electrical connection of the position detection coil 15*p* from the position detection circuit 13 to the reception circuit 16. Then, the power transmission control circuit 14 causes the reception circuit 16 to receive a wireless signal through the position detection coil 15.

In FIG. 1, upon detection of the position of the power reception coil 21 by the position detection circuit 13, the power transmission control circuit 14 controls supply of AC power from the power transmission circuit 12 to the power transmission coil 11. Upon receiving AC power from the power transmission apparatus 10 via the power reception coil 21, the power reception circuit 22 of the power reception apparatus 20 performs rectifying and smoothing of AC power and then supplies AC power to the loading device 23. The loading device 23 includes batteries to be charged or another circuit that consumes power. A DC-to-DC converter (not shown) may be interposed between the power reception circuit 22 and the loading device 23. With this configuration, constant-voltage power can be supplied to the loading device 23, regardless of the coupling coefficient between the power transmission coil 11 and the power reception coil 21 or the impedance of the loading device 23.

Figure 7:
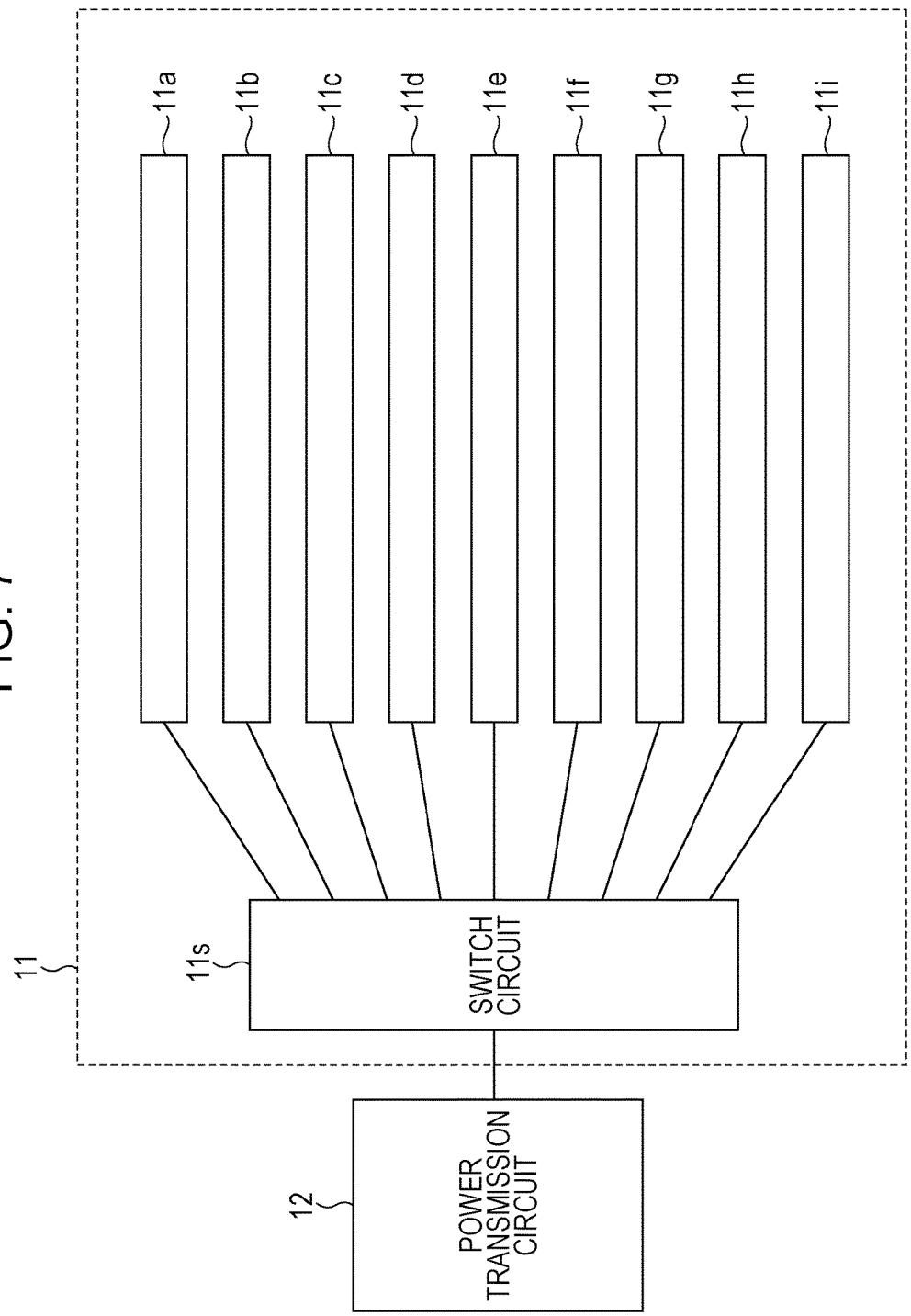
FIG. 7 is a block diagram illustrating an example of the circuitry configuration of the power transmission coil shown in FIG. 1.

FIG. 6 is a top view illustrating an example of the configuration of the power transmission coil 11 shown in FIG. 1. FIG. 7 is a block diagram illustrating an example of the circuitry configuration of the power transmission coil 11 shown in FIG. 1.

In FIG. 6, a plurality of power transmission coil elements 11*a* through 11*i* are arranged two-dimensionally so that they can cover substantially the entire area, thereby increasing the power transmission coverage. In FIG. 7, the circuitry of the power transmission coil 11 includes a switch circuit 11*s* and the power transmission coil elements 11*a* through 11*i*. The switch circuit 11*s* selects one of the power transmission coil elements 11*a* through 11*i* and connects the selected coil element to the power transmission circuit 12. In this case, by connecting the power transmission coil element located closest to the power reception coil 21 detected by the position detection circuit 13 to the power transmission circuit 12 via the switch circuit 11*s*, high-efficiency non-contact power transmission is implemented. In FIG. 6, the power transmission coil elements 11*a* through 11*i* are formed substantially in a circular shape. However, the shape of the power transmission coil elements 11*a* through 11*i* is not restricted, and may be formed in another shape, such as a square, rectangular, oblong, or elliptical shape. In particular, square or rectangular coil elements can be disposed with small gaps therebetween, thereby decreasing the range in which the coupling force between the power transmission coil 11 and the power reception coil 12 is decreased.

Figure 8:
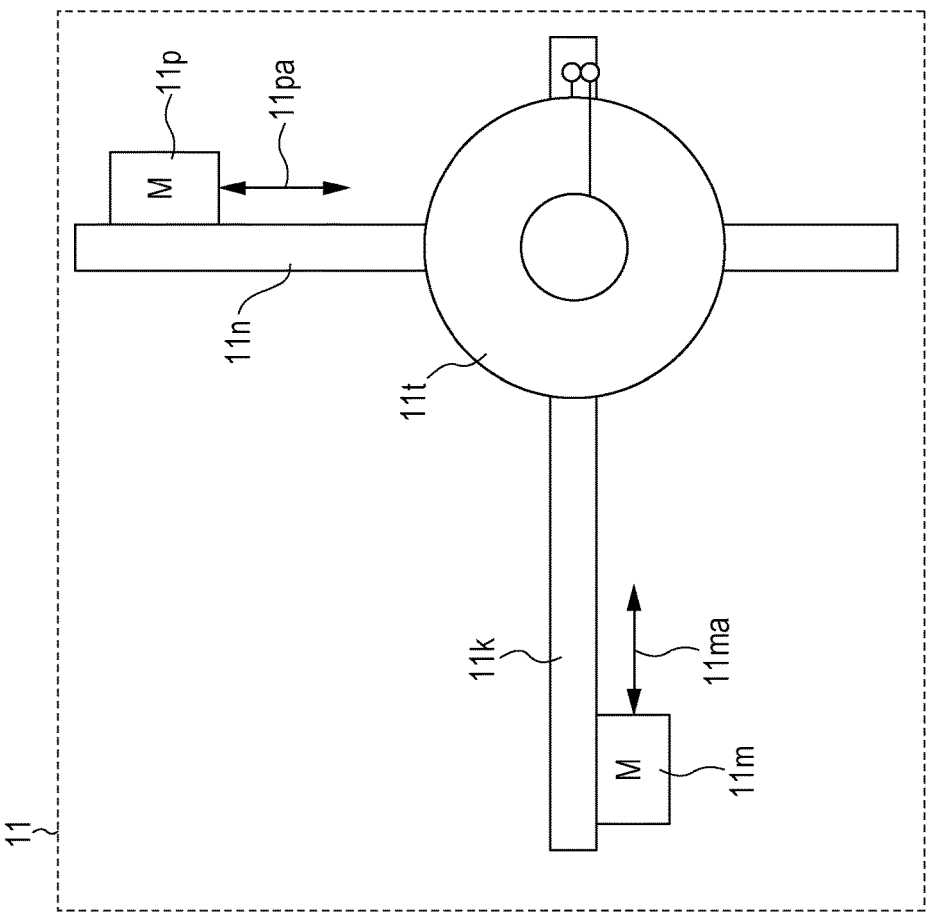
FIG. 8 is a top view illustrating another example of the configuration of the power transmission coil shown in FIG. 1.

FIG. 8 is a top view illustrating another example of the configuration of the power transmission coil 11. In FIG. 8, the power transmission coil 11 includes a power transmission coil element 11*t*, a rail 11*k* and a motor 11*m* for shifting the power transmission coil element 11*t* in the X direction indicated by the arrow 11*ma*, and a rail 11*n* and a motor 11*p* for shifting the power transmission coil element 11*t* in the Y direction indicated by the arrow 11*pa*. With this configuration, it is possible to accurately align the power transmission coil element 11*t* to the detected position of the power reception coil 21, thereby implementing high-efficiency non-contact power transmission.

As shown in FIG. 1, the power reception apparatus 20 includes the power reception control circuit 24 and the transmission circuit 25. The power reception control circuit 24 converts apparatus information concerning a desired voltage, current (a voltage and a current to be set), and charging capacity in the power reception apparatus 20, a voltage, current, and charging capacity detected in the power reception apparatus 20, and the temperature detected by a temperature sensor (hereinafter, such information will be simply referred to as "apparatus information") into a data signal which will be transmitted as a wireless signal, and then outputs the data signal to the transmission circuit 25. The transmission circuit 25 then generates a wireless signal by modulating a wireless carrier wave by using a predetermined digital modulation method in accordance with the received data signal, and transmits the wireless signal to the power transmission apparatus 10 via the power reception coil 21.

In the power transmission apparatus 10, the wireless signal is received by the position detection coil 15 and is output to the reception circuit 16. The reception circuit 16 demodulates the wireless signal into the data signal, and supplies the demodulated data signal to the power transmission control circuit 14. The power transmission control circuit 14 then controls power transmission parameters, such as the transmission power, the frequency, and the phase, used in the power transmission circuit 12. With this operation, if the loading device 23 of the power reception apparatus 20 is constituted by batteries, the above-described apparatus information can be fed back from the power reception apparatus 20 to the power transmission apparatus 10, and power transmission is controlled based on this apparatus information. As a result, optimal power transmission is implemented. Specific examples of power transmission control are as follows.

(1) Power transmission parameters are controlled so that the detected voltage and current will be a desired voltage and current.
(2) Power transmission is interrupted if the detected temperature reaches a predetermined threshold.
(3) Power transmission is interrupted if the detected charge amount reaches a predetermined threshold.

Reception of apparatus information by the power transmission apparatus 10 will be discussed below with reference to FIG. 3. Wireless communication reception is performed by using the position detection coil 15. In the example shown in FIG. 3, by receiving a wireless signal by using the position detection coil element 15a which has been determined to be located closest to the power reception coil 21, the highest power level of the received signal can be obtained. In this case, in a preferable mode, the position detection coil element determined to be located closest to the power reception coil 21 when detecting the position of the power reception coil 21 is selected as a reception coil by the switch circuits 15j and 15k (FIG. 5) in advance, and then, a wireless signal is transmitted from the power reception coil 21, thereby making it possible to obtain the highest power level of the received signal (see FIG. 5).

By using the position detection coil 15 as the reception coil for receiving apparatus information sent from the power reception apparatus 20, the distance between position detection coil 15, which serves as the reception coil, and the power reception coil 21 (the vertical distance in FIG. 2), which serves as the transmission coil, is minimized. Additionally, a member, such as a metallic member, is not interposed between the transmission coil and the reception coil. With this configuration, the coupling force between the transmission coil and the reception coil is increased, thereby further enhancing the received signal power.

Japanese Unexamined Patent Application Publication No. 2010-16985 does not disclose the alignment of a power transmission coil and a power reception coil. However, International Publication No. 2012/081519 pamphlet discloses the alignment of a power transmission coil and a power reception coil. Thus, by combining the techniques disclosed in both publications, high-efficiency power transmission may be implemented. In this case, however, a metallic position detection coil is interposed between a transmission coil (corresponding to the power reception coil 21 of the power reception apparatus 20) and a reception coil (corresponding to the power transmission coil 11 of the power transmission apparatus 10), thereby decreasing the received signal power due to a change in an electromagnetic field caused by the presence of the metallic body. Additionally, the received signal power is decreased due to an increased distance between the reception coil and the transmission coil. As a result, information transmission may not cover the entire area. In contrast, with the configuration of the first embodiment, these problems will be solved.

A different frequency from the power transmission frequency for transmitting power may be used as the wireless communication frequency for transmitting information. If the frequency of a wireless communication signal is the same as the frequency of a power transmission signal, a reception coil receives both of the wireless communication signal and the power transmission signal. Accordingly, electromagnetic noise is produced in the power transmission signal, which relatively decreases the received signal power in the reception circuit 16, thereby failing to demodulate the received signal. Then, by using the frequency of a wireless communication signal different from the frequency of a power transmission signal, the reception coil does not receive a power transmission signal, and thus, the received signal is not relatively decreased, thereby making it possible demodulate the received signal. Thus, wireless power transmission and wireless communication can be performed at the same time, thereby suppressing a decrease in the time-average power transmission efficiency.

International Publication No. 2012/164744 pamphlet discloses that the reliability of information communication is improved by providing a communication device and also by using a frequency which is different from the frequency of a power transmission signal and which is not an integral multiple of the frequency of the power transmission signal. With this configuration, however, the provision of a communication device increases the number of components, thereby increasing the size and the cost of the wireless power transmission system. Additionally, in this system, a function of aligning a power transmission coil and a power reception coil is not provided. Thus, if the position detection coil disclosed in International Publication No. 2012/081519 pamphlet is used together with this system, the cost may be increased further.

In contrast, in the first embodiment, the power reception coil 21 is used as the transmission coil, and the position detection coil 15 is used as the reception coil. It is thus possible to provide a wireless power transmission system that implements both of high-efficiency power transmission and wireless communication without increasing the size and the cost of the system. In the first embodiment, by using, as the wireless communication frequency, a frequency which is not an integral multiple of the power transmission frequency, higher harmonic components of the power transmission frequency are not received by the reception coil, thereby suppressing a relative decrease in the received signal power. The power transmission frequency is set to be, for example, 130 kHz, and the wireless-communication transmission frequency is set to be, for example, 1000 kHz.

Alternatively, not only wireless communication from the power reception apparatus 20 to the power transmission apparatus 10, but also wireless communication from the power transmission apparatus 10 to the power reception apparatus 20 may be performed. This makes it possible to perform two-way information communication, and more precise control can be performed. An example of such a modification is shown in FIG. 9.

Figure 9:
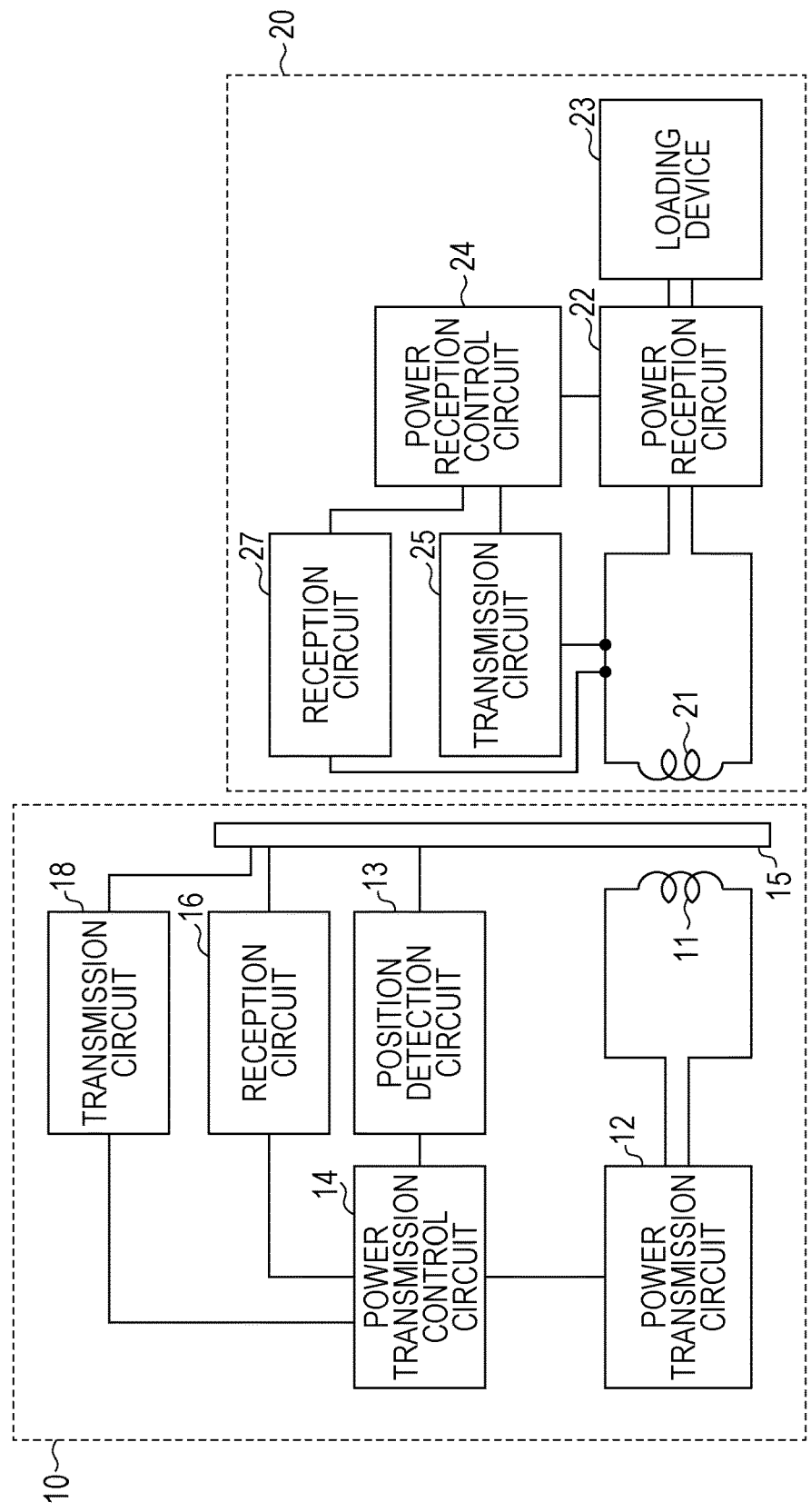
FIG. 9 is a block diagram illustrating an example of the configuration of a wireless power transmission system according to a first modified example of the first embodiment.

FIG. 9 is a block diagram illustrating an example of the configuration of a wireless power transmission system according to a first modified example of the first embodiment. The wireless power transmission system of the first modified example shown in FIG. 9 is different from that of the first embodiment shown in FIG. 1 in the following points.

(1) The power transmission apparatus 10 further includes a transmission circuit 18 between the position detection coil 15 and the power transmission control circuit 14.
(2) The power reception apparatus 20 further includes a reception circuit 27 between the power reception coil 21 and the power reception control circuit 24.

In FIG. 9, the power transmission control circuit 14 generates a data signal of an apparatus instruction signal (for example, an instruction signal instructing the power reception apparatus 20 to send a wireless signal of a data signal concerning apparatus information and a reception acknowledgement signal indicating the acknowledgement of the reception of the wireless signal), and outputs the generated data signal to the transmission circuit 18. The transmission circuit 18 then generates a wireless signal by modulating a wireless carrier wave signal in accordance with the received data signal, and sends the wireless signal to the reception circuit 27 of the power reception apparatus 20 via the position detection coil 15 and the power reception coil 21. The reception circuit 27 demodulates the received wireless signal into the data signal, and outputs the apparatus instruction signal indicated by the data signal to the power reception control circuit 24.

Accordingly, in wireless communication from the power transmission apparatus 10 to the power reception apparatus 20, the position detection coil 15 may be used as the transmission coil. This makes it possible to transmit a signal from the power transmission apparatus 10 without the need to provide an additional component. Additionally, since the position detection coil 15 is located closest to the power reception apparatus 20, the highest power level of a received signal can be obtained by the reception circuit 27 of the power reception apparatus 20. In the first modified example, as well as in the first embodiment, as the wireless communication frequency, a frequency different from the power transmission frequency (for example, 130 kHz) is selected, and in wireless communication transmission and reception, the same frequency (for example, 1000 kHz) is used. Then, transmission from the power transmission apparatus 10 and transmission from the power reception apparatus 20 are alternately performed in a time-multiplexing manner. With this arrangement, it is possible to provide a wireless power transmission system in which two-way wireless communication is implemented without being influenced by power transmission. Alternatively, as the wireless communication frequency, a frequency different from the power transmission frequency (for example, 130 kHz) is selected, and in wireless communication transmission and reception, different frequencies are used (for example, 1000 kHz and 1500 kHz). With this arrangement, it is possible to provide a wireless power transmission system in which transmission from the power transmission apparatus 10 and transmission from the power reception apparatus 20 can be performed simultaneously.

Figure 10:
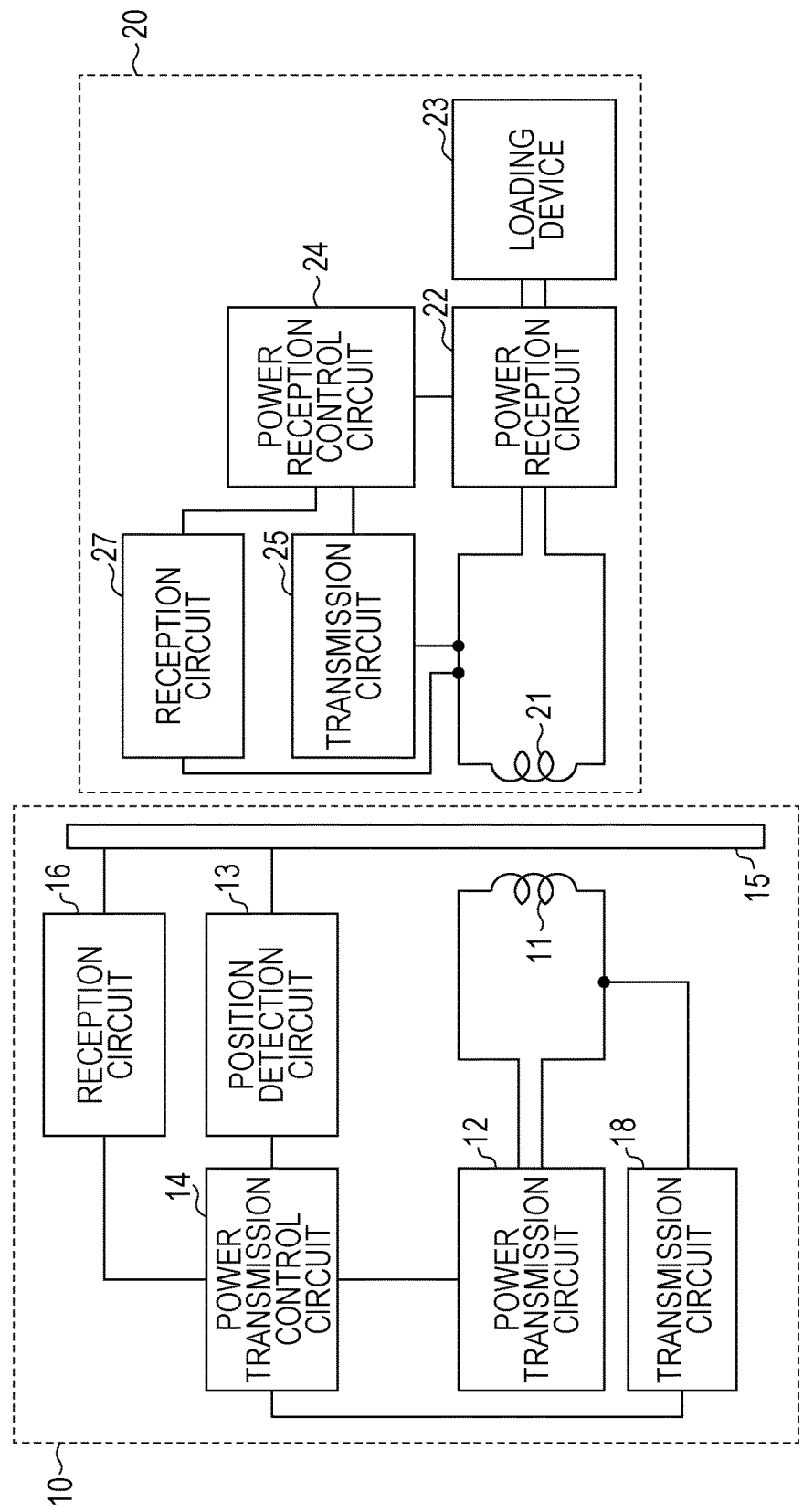
FIG. 10 is a block diagram illustrating an example of the configuration of a wireless power transmission system according to a second modified example of the first embodiment.

FIG. 10 is a block diagram illustrating an example of the configuration of a wireless power transmission system according to a second modified example of the first embodiment. The wireless power transmission system of the second modified example shown in FIG. 10 is different from that of the first modified example shown in FIG. 9 in the following point.

(1) The power transmission apparatus 10 includes a transmission circuit 18 between the power transmission coil 11 and the power transmission control circuit 14 instead of the transmission circuit 18 between the position detection coil 15 and the power transmission control circuit 14.

Accordingly, as shown in FIG. 10, in wireless communication from the power transmission apparatus 10 to the power reception apparatus 20, the power transmission coil 11 is used as the transmission coil. This makes it possible to transmit a signal from the power transmission apparatus 10 merely by making a design change to the wiring without the need to provide an additional component.

As described above, according to the first embodiment, the power transmission apparatus 10 is able to perform optimal power transmission in accordance with the loading device 23 of the power reception apparatus 20. By detecting the position of the power reception coil 21 by using the position detection coil 15, the position of the power transmission coil 11 can be aligned to the position of the power reception coil 21, thereby implementing high-efficiency non-contact power transmission. With the configuration of the first embodiment, by using the power reception coil 21 as the transmission coil of the power reception apparatus 20, the number of components is reduced, and the size and the thickness of the power reception apparatus 20 is also reduced. By using the position detection coil 15 as the reception coil of the power transmission apparatus 10, the number of components is reduced, and the size and the thickness of the power transmission apparatus 10 is also reduced. Additionally, since the position detection coil 15 is located closest to the power reception apparatus 20, the highest power level of a received signal can be obtained, thereby implementing more precise demodulation of the received signal. Moreover, when detecting the position of the power reception coil 21, the position detection coil element that has received the highest reflection intensity signal from the power reception coil 21 is selected as the reception coil, thereby reliably maximizing reception power. This makes it possible for the power reception apparatus 20 to send a transmission signal with small power. It is thus possible to provide a power transmission apparatus and a wireless power transmission system in which the power consumption in the power reception apparatus 20 can be reduced.

Second Embodiment

A wireless power transmission system according to a second embodiment of the present disclosure will be described below with reference to the drawings.

Figure 11:
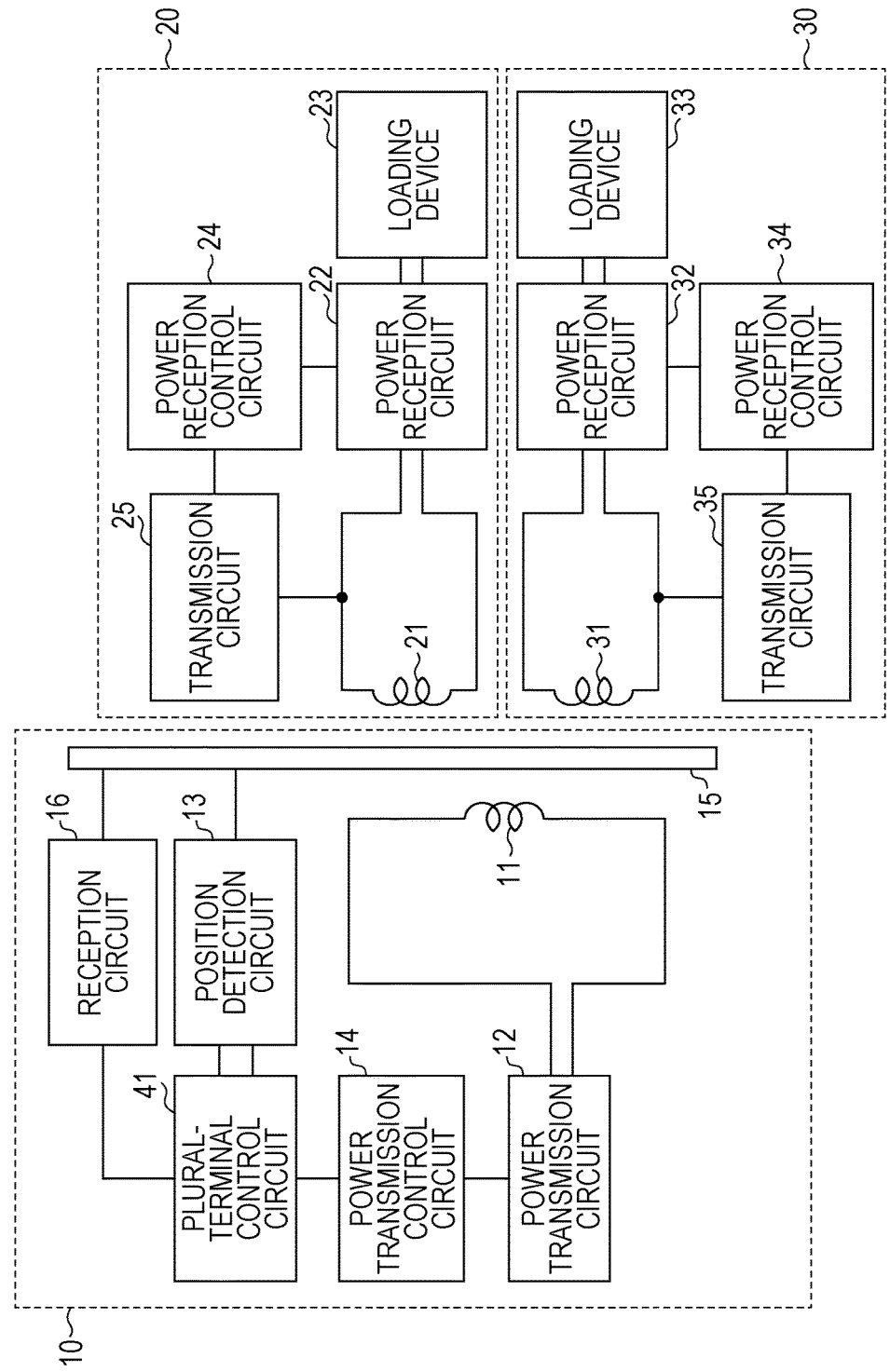
FIG. 11 is a block diagram illustrating an example of the configuration of a wireless power transmission system according to a second embodiment.
Figure 12:
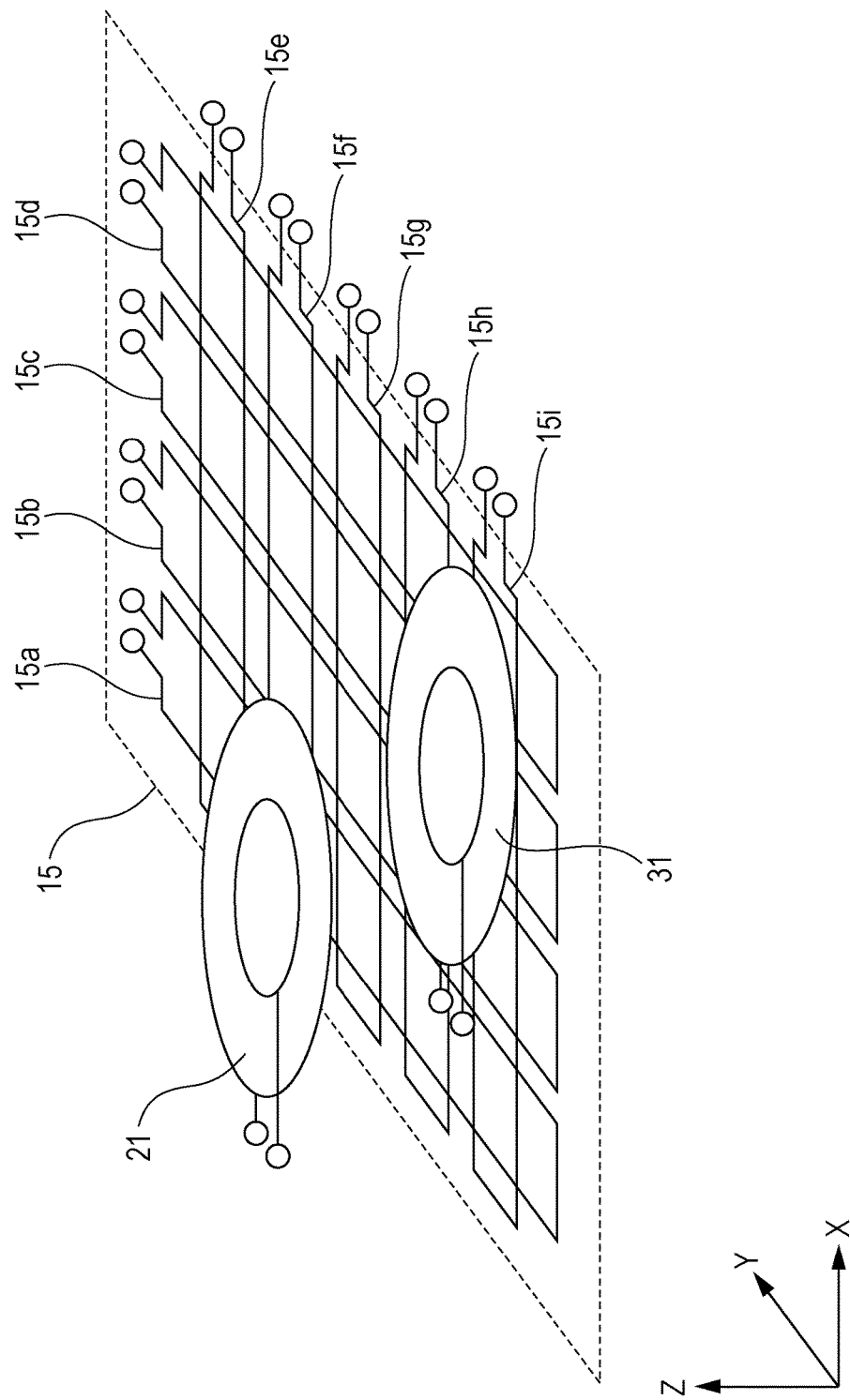
FIG. 12 is a perspective view illustrating an example of the configuration of power reception coils and a position detection coil shown in FIG. 11.

FIG. 11 is a block diagram illustrating an example of the configuration of the wireless power transmission system according to the second embodiment. FIG. 12 is a perspective view illustrating an example of the configuration of power reception coils 21 and 31 and the position detection coil 15 shown in FIG. 11. The wireless power transmission system of the second embodiment shown in FIG. 11 is different from that of the first embodiment shown in FIG. 1 in the following points.

(1) The wireless power transmission system further includes power reception apparatus 30 in addition to the power reception apparatus 20.

(2) The power transmission apparatus 10 further includes a plural-terminal control circuit 41 that controls the plurality of power reception apparatuses 20 and 30.

The power reception apparatus 30 includes, as well as the power reception apparatus 20, a power reception coil 31, a power reception circuit 32, a loading device 33, a power reception control circuit 34, and a transmission circuit 35, and is operated similarly to the power reception apparatus 20. In the power transmission apparatus 10, power is transmitted to the two power reception apparatuses 20 and 30 by using the single power transmission circuit 12 and the single power transmission coil 11.

A description will be given with reference to FIG. 12, assuming that the plurality of power transmission coil elements 11a through 11i shown in FIG. 6 are used as the power transmission coil 11. The plural-terminal control circuit 41 determines which of the plurality of power transmission coil elements 11a through 11i will be selected, on the basis of information concerning the number and the positions of power reception apparatuses 20 and 30 supplied from the position detection circuit 13 (hereinafter such information will be simply referred to as "number-and-position information"), so as to switch the switch circuit 11s. The plural-terminal control circuit 41 also determines the amount of transmission power to be supplied to each of the loading devices 23 and 33, on the basis of the number-and-position information and apparatus information concerning the loading devices 23 and 33 received from the power reception apparatuses 20 and 30 by the reception circuit 16, and outputs information concerning the determined amounts of transmission power to the power transmission control circuit 14. Then, on the basis of the received information, the power transmission control circuit 14 controls the amount of power to be supplied to each of the power reception apparatuses 20 and 30.

If power is charged or supplied to the two power reception apparatuses 20 and 30 at the same time, the plural-terminal control circuit 41 controls the switch circuit 11s of the power transmission coil 11 shown in FIG. 7 so that two power transmission coil elements will be connected to the power transmission circuit 12. For selecting power transmission coil elements, the positions of the two power reception coils 21 and 31 are detected by the position detection circuit 13 and the position detection coil 15, and power transmission coil elements located closest to the power reception coils 21 and 31 are selected under the control of the plural-terminal control circuit 41. Then, the plural-terminal control circuit 41 performs control so that the selected power transmission coil elements will be connected to the power transmission circuit 12. On the other hand, if power is charged or supplied to one power reception apparatus (for example, the power reception apparatus 20), and then, if the power is charged or supplied to the remaining power reception apparatus (for example, the power reception apparatus 30), the plural-terminal control circuit 41 controls the switch circuit 11s of the power transmission coil 11 shown in FIG. 7 so that two power transmission coil elements selected as a result of the above-described position detection operation and corresponding to the respective power reception coils 21 and 31 will be sequentially connected to the power transmission circuit 12 during their power transmission periods. The position detection operation is performed similarly to the first embodiment, and by storing position information concerning the position of the power reception coil 21 and position information concerning the position of the power reception coil 31 in the memory of the position detection circuit 13, power transmission coil elements located closest to the power reception coils 21 and 31 may be selected.

When the plurality of power reception apparatuses 20 and 30 are provided, wireless communication transmission from the power reception apparatus 20 and that from the power reception apparatus 30 may interfere with each other. Accordingly, for example, by using different frequencies for transmission from the power reception apparatus 20 and that from the power reception apparatus 30, interference of wireless communication may be avoided. For example, the transmission frequency of the power reception apparatus 20 is set to be 1000 kHz, and the transmission frequency of the power reception apparatus 30 is set to be 1500 kHz. Alternatively, the transmission frequency of the power reception apparatus 20 may be set to be 1000 kHz, and the transmission frequency of the power reception apparatus 30 may be set to be 130 kHz, which is the same frequency as the power transmission frequency. With this configuration, it is possible to provide a wireless power transmission system in which interference of wireless communication performed by two power reception apparatuses can be avoided without using another frequency. Alternatively, the same frequency (for example, 1000 kHz) may be used for transmission from the power reception apparatus 20 and that from the power reception apparatus 30, and transmission from the power reception apparatus 20 and that from the power reception apparatus 30 are performed at different times (time slots), thereby making it possible to avoid interference of wireless communication. With this configuration, it is possible to provide a wireless power transmission system in which interference of wireless communication performed by two power reception apparatuses can be avoided without using another frequency.

Not only wireless communication from the power reception apparatuses 20 and 30 to the power transmission apparatus 10, but also wireless communication from the power transmission apparatus 10 to the power reception apparatuses 20 and 30 may be performed. This makes it possible to perform two-way information communication, and more precise control can be performed. An example of such a modification is shown in FIG. 13.

Figure 13:
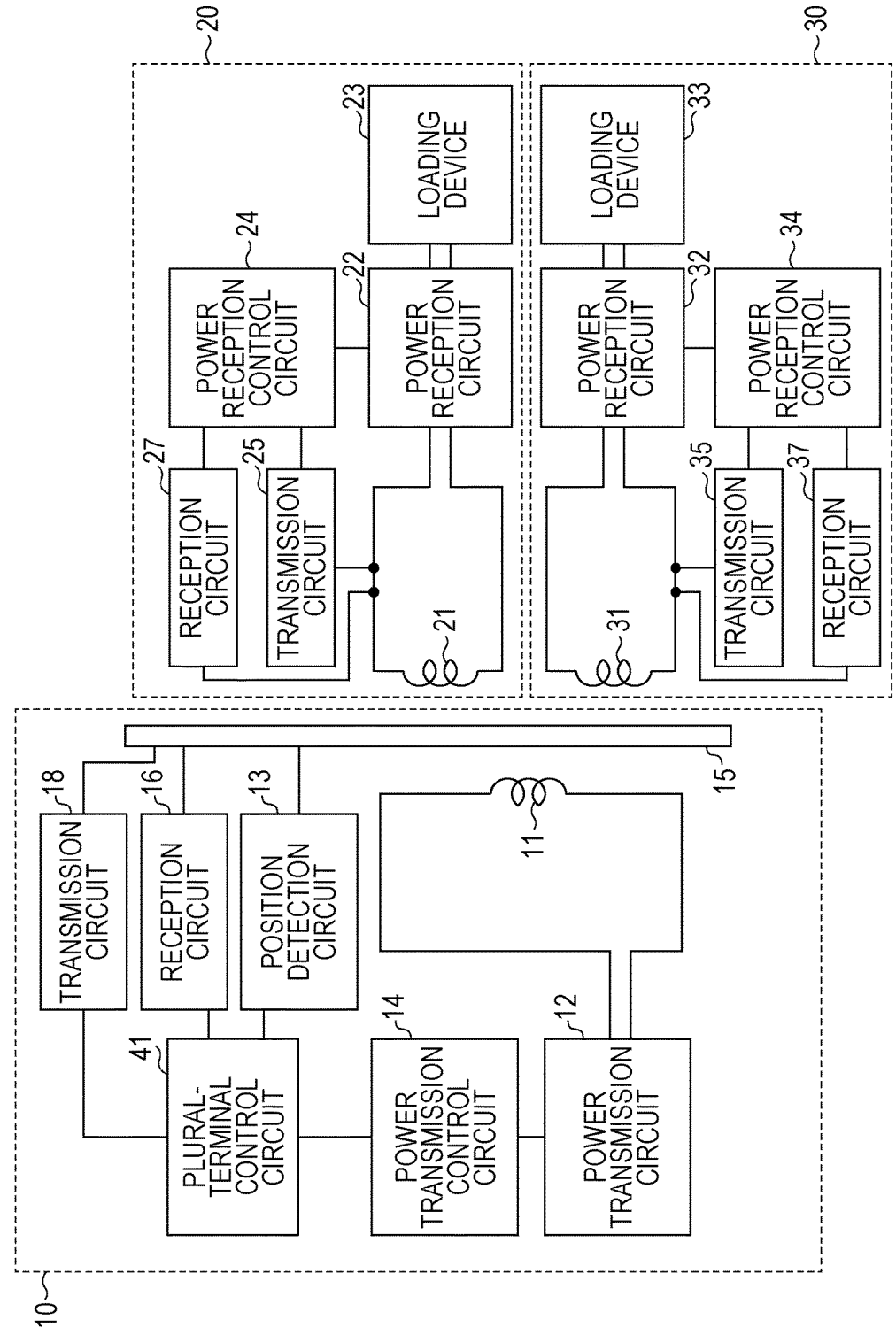
FIG. 13 is a block diagram illustrating an example of the configuration of a wireless power transmission system according to a first modified example of the second embodiment.

FIG. 13 is a block diagram illustrating an example of the configuration of a wireless power transmission system according to a first modified example of the second embodiment. The wireless power transmission system of the first modified example shown in FIG. 13 is different from that of the second embodiment shown in FIG. 11 in the following points.

(1) The power transmission apparatus 10 further includes a transmission circuit 18 between the position detection coil 15 and the plural-terminal control circuit 41.

(2) The power reception apparatus 20 further includes a reception circuit 27 between the power reception coil 21 and the power reception control circuit 24, and the power reception apparatus 30 further includes a reception circuit 37 between the power reception coil 31 and the power reception control circuit 34.

In FIG. 13, in wireless communication from the power transmission apparatus 10 to the power reception apparatuses 20 and 30, the position detection coil 15 may be used as the transmission coil. This makes it possible to transmit a signal from the power transmission apparatus 10 without the need to provide an additional component. Additionally, since the position detection coil 15 is located closest to the power reception apparatuses 20 and 30, the highest power level of a received signal can be obtained by the reception circuits 27 and 37 of the power reception apparatuses 20 and 30, respectively. In the first modified example, as well as in the second embodiment, as the wireless communication frequency, a frequency different from the power transmission frequency (for example, 130 kHz) is selected, and in wireless communication transmission and reception, the same frequency (for example, 1000 kHz) is used. Then, transmission from the power transmission apparatus 10 and transmission from the power reception apparatuses 20 and 30 are alternately performed in a time-multiplexing manner. With this arrangement, it is possible to provide a wireless power transmission system in which two-way wireless communication is implemented without being influenced by power transmission. Alternatively, as the wireless communication frequency, a frequency different from the power transmission frequency (for example, 130 kHz) is selected, and in wireless communication transmission and reception in the power reception apparatus 20, different frequencies are used (for example, 1000 kHz and 1500 kHz), and in wireless communication transmission and reception in the power reception apparatus 30, different frequencies are used (for example, 1100 kHz and 1600 kHz). With this arrangement, it is possible to provide a wireless power transmission system in which transmission from the power transmission apparatus 10, transmission from the power reception apparatus 20, and transmission from the power reception apparatus 30 can be performed simultaneously. Alternatively, as the wireless communication frequency, a frequency different from the power transmission frequency (for example, 130 kHz) is selected, and in transmission from the power reception apparatus 20 and in transmission from the power reception apparatus 30, the same frequency (for example, 1000 kHz) is used, and transmission from the power reception apparatus 20 and that from the power reception apparatus 30 are performed at different times (time slots). Also, the same frequency (for example, 15000 kHz) is used for transmission from the power transmission apparatus 10 to the power reception apparatus 20 and that to the power reception apparatus 30, and transmission from the power transmission apparatus 10 to the power reception apparatus 20 and that to the power reception apparatus 30 are performed at different times (time slots). As a result, it is possible to avoid interference of wireless communication. With this arrangement, it is possible to provide a wireless power transmission system in which transmission from the power transmission apparatus 10 and transmission from the power reception apparatuses 20 and 30 can be performed simultaneously.

Figure 14:
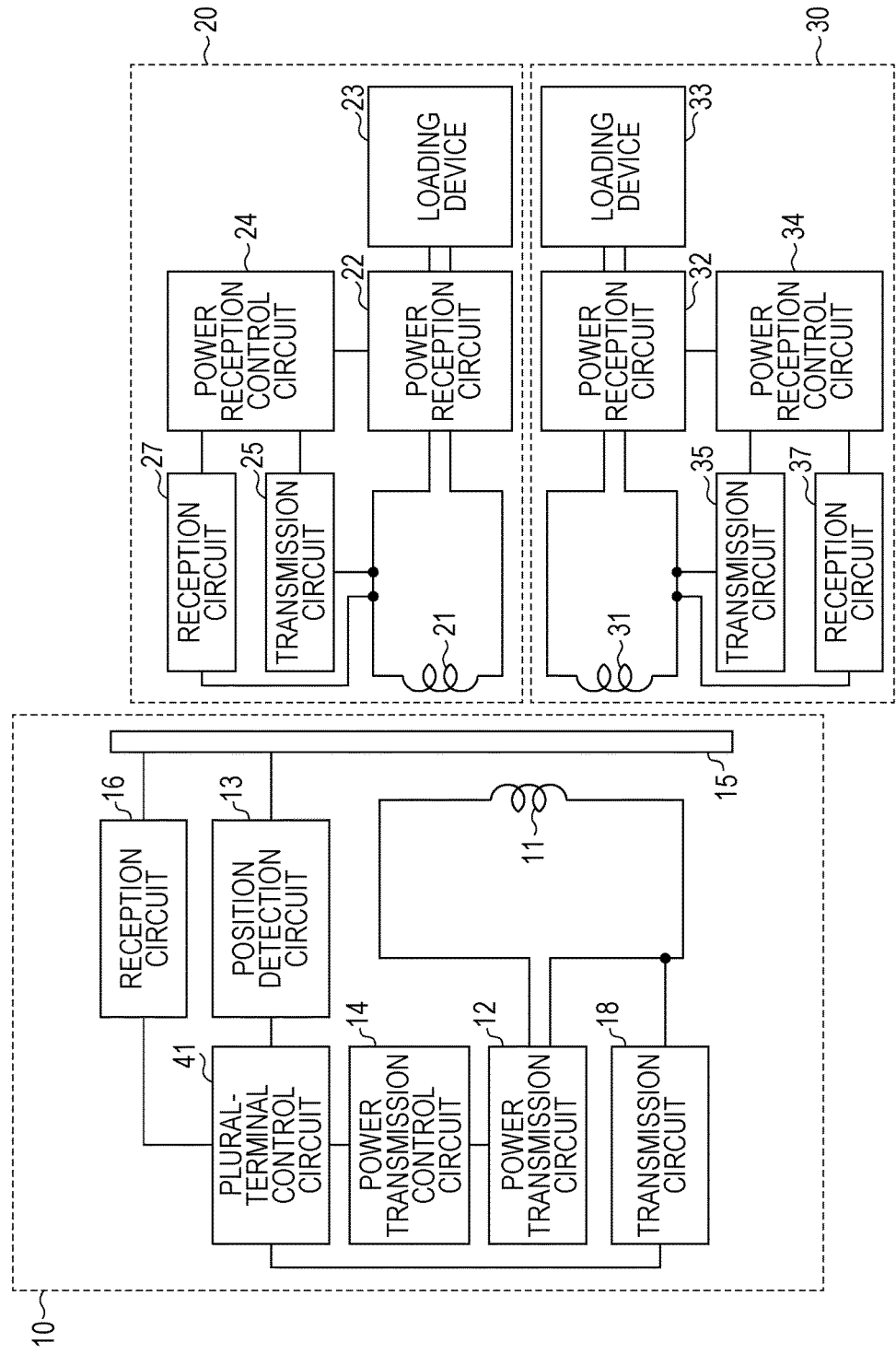
FIG. 14 is a block diagram illustrating an example of the configuration of a wireless power transmission system according to a second modified example of the second embodiment.

FIG. 14 is a block diagram illustrating an example of the configuration of a wireless power transmission system according to a second modified example of the second embodiment. The wireless power transmission system of the second modified example shown in FIG. 14 is different from that of the first modified example shown in FIG. 13 in the following point.

(1) The power transmission apparatus 10 includes a transmission circuit 18 between the power transmission coil 11 and the plural-terminal control circuit 41 instead of the transmission circuit 18 between the position detection coil 15 and the plural-terminal control circuit 41.

Accordingly, as shown in FIG. 14, in wireless communication from the power transmission apparatus 10 to the power reception apparatuses 20 and 30, the power transmission coil 11 may be used as the transmission coil. With this arrangement, it is possible to provide a power transmission apparatus and a wireless power transmission system in which transmission from the power transmission apparatus 10 can be performed without the need to provide an additional component.

In the second embodiment and the first and second modified examples thereof, an example in which power is charged or supplied to the two power reception apparatuses 20 and 30 has been discussed. However, the number of power reception apparatuses is not restricted to two, and power may be charged or supplied to three or more power reception apparatuses. In this case, as in the case in which power is charged or supplied to two power reception apparatuses, the power transmission apparatus 10 includes the plural-terminal control circuit 41. Then, the plural-terminal control circuit 41 determines the amount of transmission power to be supplied to each of the loading devices of the power reception apparatuses, on the basis of number-and-position information supplied from the position detection circuit 13 and apparatus information received from the power reception apparatuses by the reception circuit 16, and then outputs information concerning the determined amounts of transmission power to the power transmission control circuit 14. Then, on the basis of the received information, the power transmission control circuit 14 controls the amount of power to be supplied to each of the power reception apparatuses.

If power is charged or supplied to all the power reception apparatuses at the same time, the position detection circuit 13 detects the positions of the power reception coils of all the power reception apparatuses, and then, under the control of the plural-terminal control circuit 41, the position detection circuit 13 selects the corresponding number of power transmission coil elements 11a through 11i located closest to the power reception coils of the respective power reception apparatuses and connects the selected coil elements to the power transmission circuit 12. In this manner, power can be charged or supplied to all the power reception apparatuses at the same time. On the other hand, if power is sequentially charged or supplied to the power reception apparatuses, under the control of the plural-terminal control circuit 41, the switch circuit 11s of the power transmission coil 11 shown in FIG. 7 selects the corresponding number of power transmission coil elements as a result of the above-described position detection operation and corresponding to the respective power reception coils and sequentially connects the selected coil elements to the power transmission circuit 12 during their power transmission periods. The position detection operation is performed similarly to the first embodiment, and by storing position information concerning the position of the power reception coils in the memory of the position detection circuit 13, power transmission coil elements located closest to the power reception coils may be selected.

In the second embodiment and the first and second modified examples thereof, the power transmission coil 11 including the plurality of power transmission coil elements 11a through 11i, such as that shown in FIG. 6, is used. However, the power transmission coil 11 is not restricted to this type. For example, as in the power transmission coil 11 shown in FIG. 8, the power transmission coil element 11t may be shifted by using the motors 11m and 11p so that it can be aligned to be the power reception coils. In this case, the number of power transmission coil elements 11t has to be the same as that of power reception apparatuses to which power is simultaneously transmitted. With this arrangement, however, it is possible to accurately align the power transmission coil elements 11t to the detected positions of the power reception coils of the respective power reception apparatuses. It is thus possible to provide a wireless power transmission system implementing higher power transmission efficiency.

As described above, according to the second embodiment, when a plurality of power reception apparatuses (for example, power reception apparatuses 20 and 30) are provided, the power transmission apparatus 10 is able to perform optimal power transmission in accordance with each of the loading devices 23 and 33 of the power reception apparatuses 20 and 30, respectively. By detecting the positions of the power reception coils 21 and 31 by using the position detection coil 15, the position of the power transmission coil 11 can be aligned to the positions of the power reception coils 21 and 31, thereby implementing high-efficiency non-contact power transmission. With the configuration of the second embodiment, by using the power reception coils 21 and 31 as the transmission coils of the power reception apparatuses 20 and 30, respectively, the number of components is reduced, and the size and the thickness of the power reception apparatuses 20 and 30 is also reduced. By using the position detection coil 15 as the reception coil of the power transmission apparatus 10, the number of components is reduced, and the size and the thickness of the power transmission apparatus 10 is also reduced. Additionally, since the position detection coil 15 is located closest to the power reception apparatuses 20 and 30, the highest power level of a received signal can be obtained, thereby implementing more precise demodulation of the received signal. Moreover, when detecting the positions of the power reception coils 21 and 31, the position detection coil element that has received the highest reflection intensity signal from each of the power reception coils 21 and 31 is selected as the reception coil, thereby reliably maximizing reception power. This makes it possible for the power reception apparatuses 20 and 30 to send a transmission signal with small power, thereby reducing power consumption of the power reception apparatuses 20 and 30.

Third Embodiment

A wireless power transmission system according to a third embodiment of the present disclosure will be described below with reference to the drawings.

Figure 15:
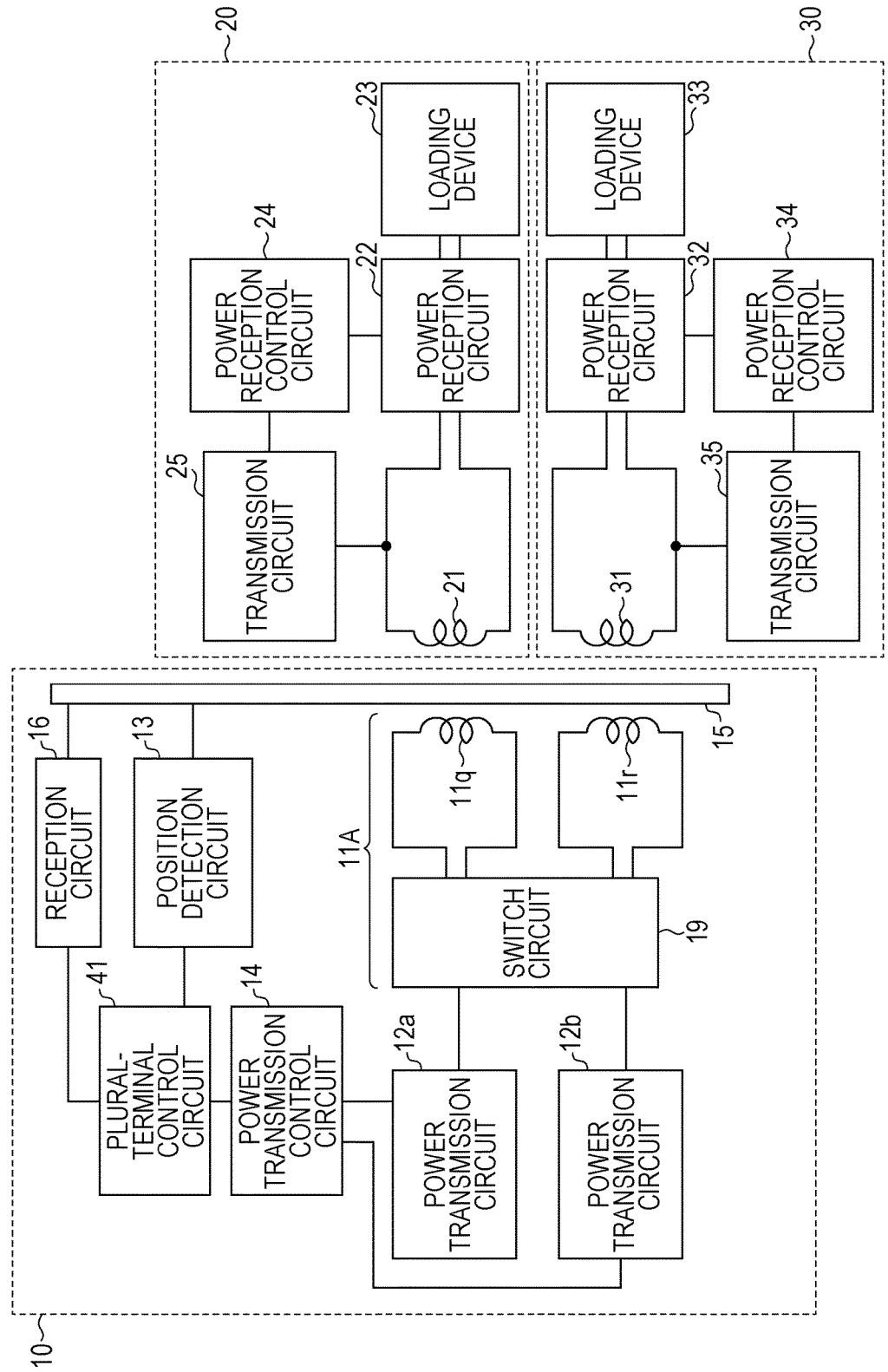
FIG. 15 is a block diagram illustrating an example of the configuration of a wireless power transmission system according to a third embodiment.
Figure 16:
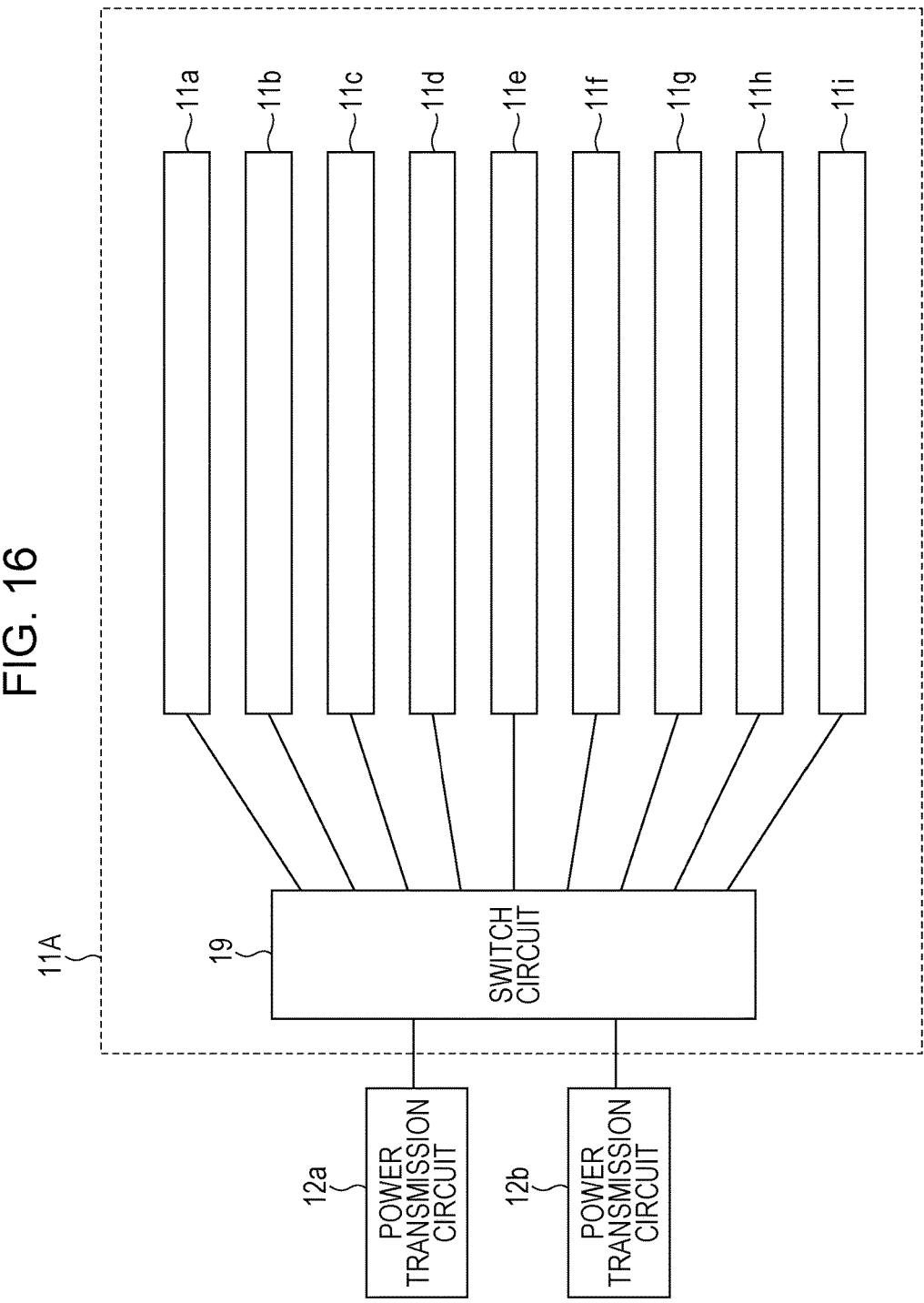
FIG. 16 is a block diagram illustrating an example of the configuration of a power transmission coil circuit shown in FIG. 15.

FIG. 15 is a block diagram illustrating an example of the configuration of the wireless power transmission system according to the third embodiment. FIG. 16 is a block diagram illustrating an example of the configuration of a power transmission coil circuit 11A shown in FIG. 15. The wireless power transmission system of the third embodiment shown in FIGS. 15 and 16 is different from that of the second embodiment shown in FIG. 11 in the following points.
(1) Instead of the power transmission coil 11, the power transmission coil circuit 11A including power transmission coil elements 11a through 11i shown in FIG. 16 and configured as shown in FIG. 6 and a switch circuit 19 is provided. The switch circuit 19 is used for selecting power transmission coil elements and connecting them to power transmission circuits 12a and 12b. In FIG. 15, selected two power transmission coil elements 11q and 11r are shown.
(2) Instead of the power transmission circuit 12, two power transmission circuits 12a and 12b are provided.

In the third embodiment, two power reception apparatuses 20 and 30 are provided, and power is transmitted to the two power reception apparatuses 20 and 30 by using the two power transmission circuits 12a and 12b of the power transmission apparatus 10. In the third embodiment, as in the second embodiment, on the basis of number-and-position information received from the position detection circuit 13, the plural-terminal control circuit 41 determines which one or two of the plurality of power transmission coil elements 11a through 11i (FIGS. 6 and 16) will be selected and to which one of the power transmission circuits 12a and 12b the selected power transmission coil elements will be connected, and then switches the switch circuit 19. The plural-terminal control circuit 41 also determines the amount of transmission power to be supplied to each of the loading devices 23 and 33, on the basis of the number-and-position information and apparatus information concerning the loading devices 23 and 33 received from the power reception apparatuses 20 and 30, respectively, by the reception circuit 16, and outputs information concerning the determined amounts of transmission power to the power transmission control circuit 14. Then, on the basis of the received information, the power transmission control circuit 14 controls the amounts of power to be supplied from the power transmission circuits 12a and 12b to the power reception apparatuses 20 and 30, respectively. For selecting power transmission coil elements, the positions of the two power reception coils 21 and 31 are detected by the position detection circuit 13 and the position detection coil 15.

That is, as shown in FIG. 16, under the control of the plural-terminal control circuit 41, among the power transmission coil elements 11a through 11i, power transmission coil elements located closest to the power reception coils 21 and 31 are selected and are connected to the power transmission circuits 12a and 12b by using the switch circuit 19. In the example shown in FIG. 15, the power transmission coil element selected for supplying power to the power reception coil 21 is the power transmission coil element 11q, while the power transmission coil element selected for supplying power to the power reception coil 31 is the power transmission coil element 11r. With this arrangement, it is possible to charge or supply power to the two power reception apparatuses 20 and 30 at the same time. With this configuration, since the individual power transmission circuits 12a and 12b are provided for the power reception apparatuses 20 and 30, respectively, power transmission optimal for the loading devices 23 and 33 is implemented under the control of the plural-terminal control circuit 41. The position detection operation is performed similarly to the first embodiment, and by storing position information concerning the position of the power reception coil 21 and position information concerning the position of the power reception coil 31 in the memory of the position detection circuit 13, power transmission coil elements located closest to the power reception coils 21 and 31 may be selected.

In the third embodiment, as well as in the second embodiment, when the plurality of power reception apparatuses 20 and 30 are provided, wireless communication transmission from the power reception apparatus 20 and that from the power reception apparatus 30 may interfere with each other. Accordingly, for example, by using different frequencies for transmission from the power reception apparatus 20 and that from the power reception apparatus 30, interference of wireless communication may be avoided. For example, the transmission frequency of the power reception apparatus 20 is set to be 1000 kHz, and the transmission frequency of the power reception apparatus 30 is set to be 1500 kHz. Alternatively, the transmission frequency of the power reception apparatus 20 may be set to be 1000 kHz, and the transmission frequency of the power reception apparatus 30 may be set to be 130 kHz, which is the same frequency as the power transmission frequency. With this configuration, it is possible to provide a wireless power transmission system in which interference of wireless communication performed by two power reception apparatuses can be avoided without using another frequency. Alternatively, the same frequency (for example, 1000 kHz) may be used for transmission from the power reception apparatus 20 and that from the power reception apparatus 30, and transmission from the power reception apparatus 20 and that from the power reception apparatus 30 are performed at different times (time slots), thereby making it possible to avoid interference of wireless communication. With this configuration, it is possible to provide a wireless power transmission system in which interference of wireless communication performed by two power reception apparatuses can be avoided without using another frequency.

Not only wireless communication from the power reception apparatuses 20 and 30 to the power transmission apparatus 10, but also wireless communication from the power transmission apparatus 10 to the power reception apparatuses 20 and 30 may be performed. This makes it possible to perform two-way information communication, and more precise control can be performed.

Figure 17:
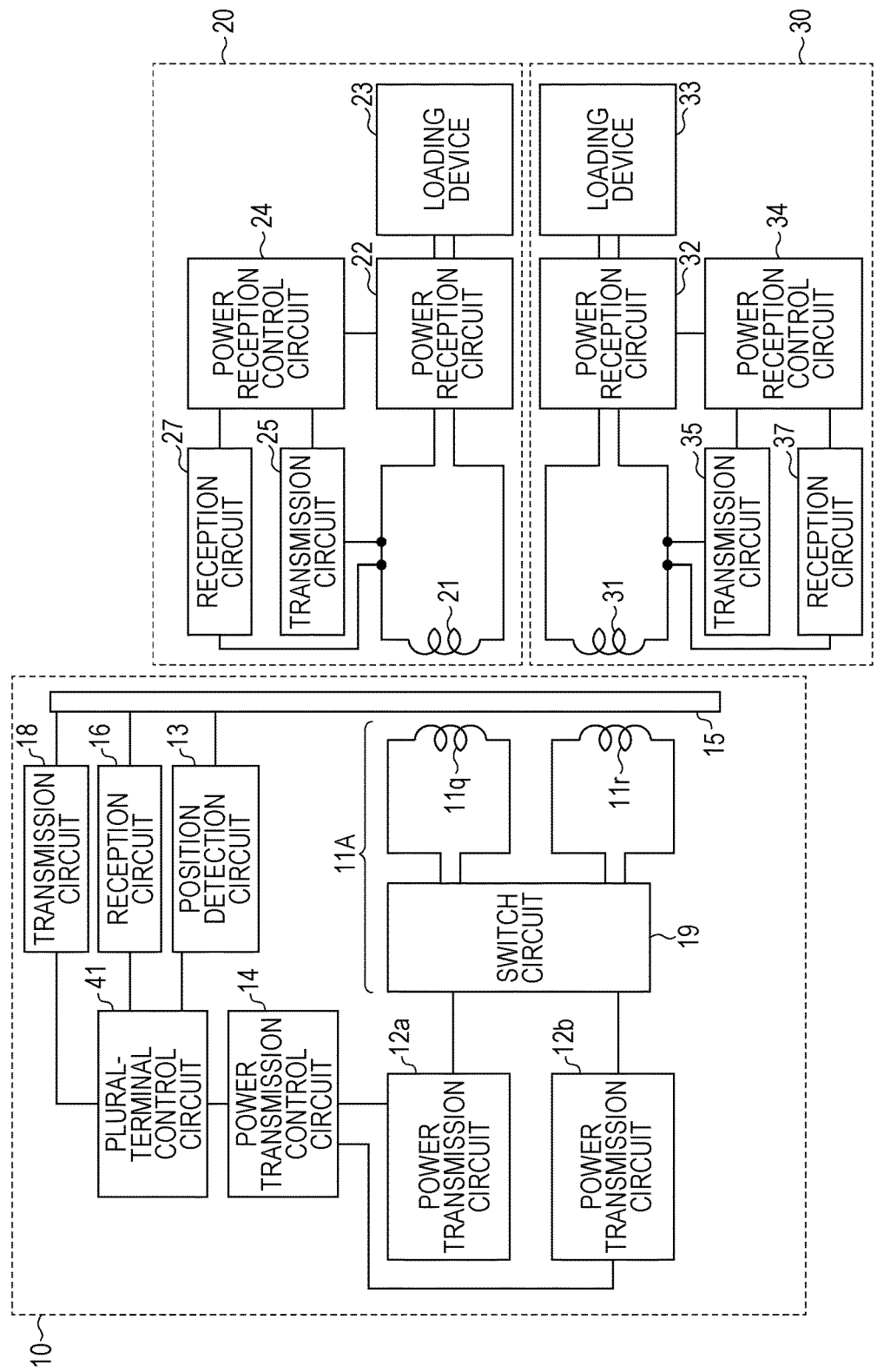
FIG. 17 is a block diagram illustrating an example of the configuration of a wireless power transmission system according to a first modified example of the third embodiment.

FIG. 17 is a block diagram illustrating an example of the configuration of a wireless power transmission system according to a first modified example of the third embodiment. The wireless power transmission system of the first modified example shown in FIG. 17 is different from that of the third embodiment shown in FIG. 15 in the following points.

(1) The power transmission apparatus 10 further includes a transmission circuit 18 between the position detection coil 15 and the plural-terminal control circuit 41.

(2) The power reception apparatus 20 further includes a reception circuit 27 between the power reception coil 21 and the power reception control circuit 24, and the power reception apparatus 30 further includes a reception circuit 37 between the power reception coil 31 and the power reception control circuit 34.

In the first modified example, as shown in FIG. 17, in wireless communication from the power transmission apparatus 10 to the power reception apparatuses 20 and 30, the position detection coil 15 may be used as the transmission coil. This makes it possible to transmit a signal from the power transmission apparatus 10 without the need to provide an additional component. Additionally, since the position detection coil 15 is located closest to the power reception apparatuses 20 and 30, the highest power level of a received signal can be obtained by the reception circuits 27 and 37 of the power reception apparatuses 20 and 30, respectively. In the first modified example, as well as in the third embodiment, as the wireless communication frequency, a frequency different from the power transmission frequency (for example, 130 kHz) is selected, and in wireless communication transmission and reception, the same frequency (for example, 1000 kHz) is used. Then, transmission from the power transmission apparatus 10 and transmission from the power reception apparatuses 20 and 30 are alternately performed in a time-multiplexing manner. With this arrangement, it is possible to provide a wireless power transmission system in which two-way wireless communication is implemented without being influenced by power transmission. Alternatively, as the wireless communication frequency, a frequency different from the power transmission frequency (for example, 130 kHz) is selected, and in wireless communication transmission and reception in the power reception apparatus 20, different frequencies are used (for example, 1000 kHz and 1500 kHz), and in wireless communication transmission and reception in the power reception apparatus 30, different frequencies are used (for example, 1100 kHz and 1600 kHz). With this arrangement, it is possible to provide a wireless power transmission system in which transmission from the power transmission apparatus 10, transmission from the power reception apparatus 20, and transmission from the power reception apparatus 30 can be performed simultaneously. Alternatively, as the wireless communication frequency, a frequency different from the power transmission frequency (for example, 130 kHz) is selected, and in transmission from the power reception apparatus 20 and in transmission from the power reception apparatus 30, the same frequency (for example, 1000 kHz) is used. Then, transmission from the power reception apparatus 20 and that from the power reception apparatus 30 are performed at different times (time slots). Also, the same frequency (for example, 15000 kHz) is used for transmission from the power transmission apparatus 10 to the power reception apparatus 20 and that to the power reception apparatus 30, and transmission from the power transmission apparatus 10 to the power reception apparatus 20 and that to the power reception apparatus 30 are performed at different times (time slots). As a result, it is possible to avoid interference of wireless communication. With this arrangement, it is possible to provide a wireless power transmission system in which transmission from the power transmission apparatus 10 and transmission from the power reception apparatuses 20 and 30 can be performed simultaneously.

Figure 18:
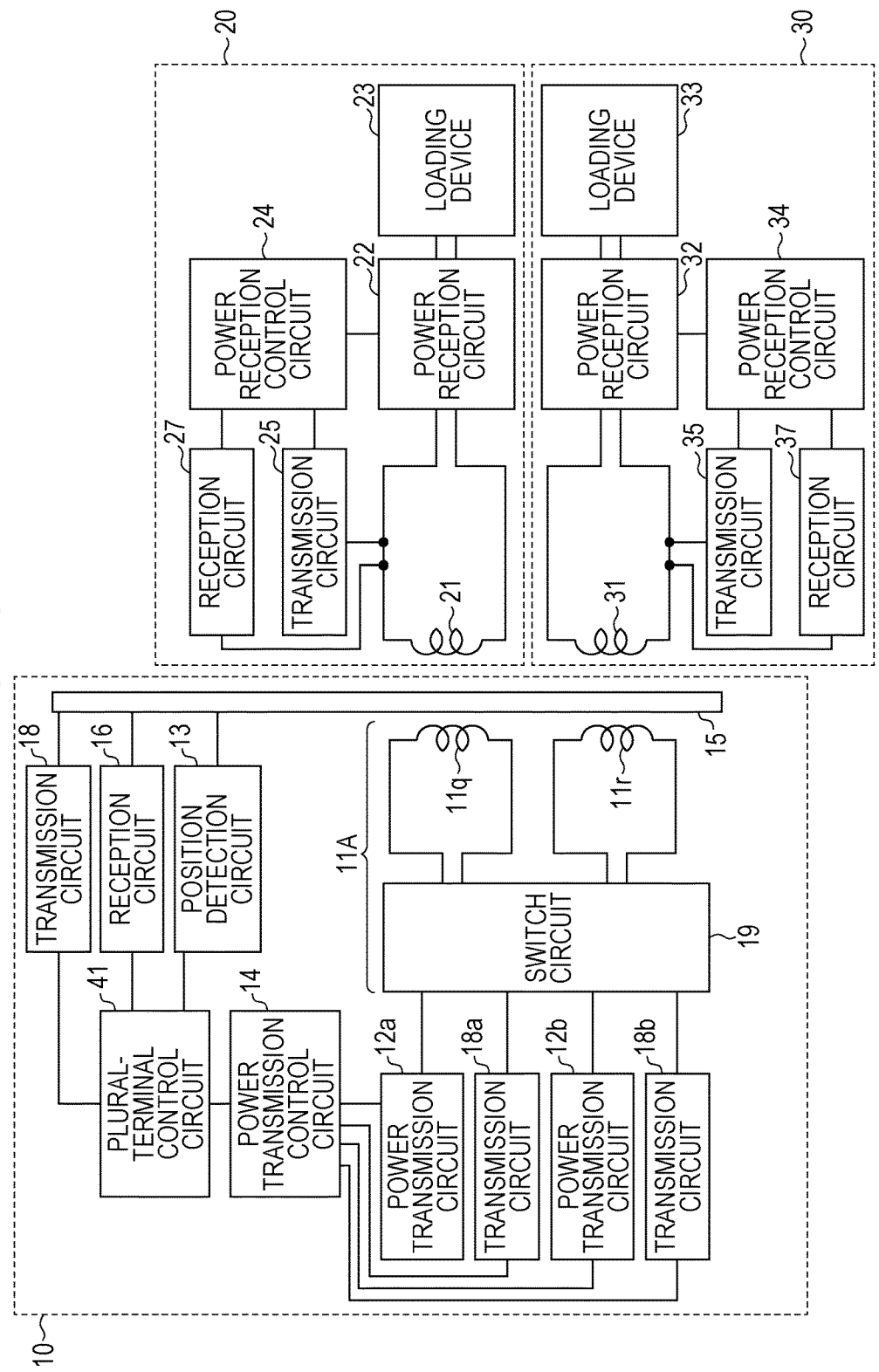
FIG. 18 is a block diagram illustrating an example of the configuration of a wireless power transmission system according to a second modified example of the third embodiment.

FIG. 18 is a block diagram illustrating an example of the configuration of a wireless power transmission system according to a second modified example of the third embodiment. The wireless power transmission system of the second modified example shown in FIG. 18 is different from that of the first modified example shown in FIG. 17 in the following point. Two transmission circuits 18a and 18b between the power transmission coil circuit 11A and the power transmission control circuit 14 are provided.

Accordingly, as shown in FIG. 18, in wireless communication from the power transmission apparatus 10 to the power reception apparatuses 20 and 30, the power transmission coil 11 may be used as the transmission coil. With this arrangement, it is possible to provide a power transmission apparatus and a wireless power transmission system in which transmission from the power transmission apparatus can be performed without the need to provide an additional component.

In the third embodiment and the first and second modified examples thereof, an example in which power is charged or supplied to the two power reception apparatuses 20 and 30 has been discussed. However, the number of power reception apparatuses is not restricted to two, and power may be charged or supplied to three or more power reception apparatuses by providing the corresponding number of power transmission circuits. In this case, the plural-terminal control circuit 41 controls the switch circuit 19 on the basis of number-and-position information supplied from the position detection circuit 13 so as to select power transmission coils and power transmission circuits. The plural-terminal control circuit 41 then determines the amounts of transmission power to be supplied to the loading devices of the power reception apparatuses, on the basis of apparatus information received from the power reception apparatuses by the reception circuit 16, and then outputs information concerning the determined amounts of transmission power to the power transmission control circuit 14. As a result, non-contact power transmission suitable for the states of the power reception apparatuses is implemented.

If power is charged or supplied to all the power reception apparatuses at the same time, the position detection circuit 13 detects the positions of the power reception coils of all the power reception apparatuses, and then, under the control of the plural-terminal control circuit 41, the position detection circuit 13 selects the corresponding number of power transmission coil elements located closest to the power reception coils of the respective power reception apparatuses and connects the selected coil elements to the corresponding power transmission circuits. In this manner, power can be charged or supplied to all the power reception apparatuses at the same time. If the number of power reception apparatuses is greater than the number of power transmission circuits, under the control of the plural-terminal control circuit 41, power is first charged or supplied to the same number of power reception apparatuses as that of power transmission circuits, and then, every time power has been charged or supplied to one power reception apparatus, power is sequentially charged or supplied to the remaining number of power reception apparatuses. The position detection operation is performed similarly to the first embodiment, and by storing position information concerning the positions of the power reception coils in the memory of the position detection circuit 13, power transmission coil elements located closest to the power reception coils may be selected.

In the third embodiment, the power transmission coil 11 including the plurality of power transmission coil elements 11a through 11i, such as that shown in FIG. 6, is used. However, the power transmission coil 11 is not restricted to this type. For example, as in the power transmission coil 11 shown in FIG. 8, the power transmission coil element 11t may be shifted by using the motors 11m and 11p so that it can be aligned to be the power reception coils. In this case, the number of power transmission coil elements shifted by the motors 11m and 11p has to be the same as that of power reception apparatuses to which power is simultaneously transmitted. With this arrangement, however, it is possible to accurately align the power transmission coil elements to the detected positions of the power reception coils of the respective power reception apparatuses. It is thus possible to provide a wireless power transmission system implementing higher power transmission efficiency.

As described above, according to the third embodiment and the first and second modified examples thereof, when a plurality of power reception apparatuses (for example, power reception apparatuses 20 and 30) are provided, the power transmission apparatus 10 is able to perform optimal power transmission in accordance with each of the loading devices 23 and 33 of the power reception apparatuses 20 and 30, respectively. By detecting the positions of the power reception coils 21 and 31 by using the position detection coil 15, the position of the power transmission coils 11q and 11p can be aligned to the positions of the power reception coils 21 and 31, respectively, thereby implementing high-efficiency non-contact power transmission. Moreover, by providing a plurality of power transmission circuits (for example, the power transmission circuits 12a and 12b), power transmission to the individual power reception apparatuses 20 and 30 can be performed independently. It is thus possible to perform optimal power transmission control for the loading devices 23 and 33 of the power reception apparatuses 20 and 30, respectively. With the configuration of the third embodiment, by using the power reception coils 21 and 31 as the transmission coils of the power reception apparatuses 20 and 30, respectively, the number of components is reduced, and the size and the thickness of the power reception apparatuses 20 and 30 is also reduced. By using the position detection coil 15 as the reception coil of the power transmission apparatus 10, the number of components is reduced, and the size and the thickness of the power transmission apparatus 10 is also reduced. Additionally, since the position detection coil 15 is located closest to the power reception apparatuses 20 and 30, the highest power level of a received signal can be obtained, thereby implementing more precise demodulation of the received signal. Moreover, when detecting the positions of the power reception coils 21 and 31, the position detection coil element that has received the highest reflection intensity signal from each of the power reception coils 21 and 31 is selected as the reception coil, thereby reliably maximizing reception power. This makes it possible for the power reception apparatuses 20 and 30 to send a transmission signal with small power, thereby reducing power consumption of the power reception apparatuses 20 and 30.

Modified Examples

The power transmission coil 11, the power transmission coil elements 11a through 11i, 11q, 11r, and 11t, and magnetic member 17 according to the first through third embodiments and the modified examples thereof are formed substantially in a circular shape. However, they may be formed in another shape, such as a square, longitudinal, or elliptical shape. The power transmission coil 11 may be wound in a spiral shape or in a solenoid shape.

The power reception coils 21 and 31 and magnetic member 27 according to the first through third embodiments and the modified examples thereof are formed substantially in a circular shape. However, they may be formed in another shape, such as a square, longitudinal, or elliptical shape. The power reception coils 21 and 31 may be wound in a spiral shape or in a solenoid shape. The position detection coil elements 15a through 15i are formed substantially in a rectangular shape. However, they may be formed in another shape, such as a circular, square, oblong, or elliptical shape.

The foregoing description of the disclosed embodiments has been provided for the purposes of illustration and description. It is not intended to be exhaustive or to limit the disclosure to the precise forms disclosed. The scope of the present disclosure is determined, not by the foregoing description, but by the following claims, and encompass all modifications and variations within the scope of the claims and their equivalents.

(Power Transmission Apparatus According to First Aspect of the Present Disclosure)

A power transmission apparatus according to a first aspect of the disclosure is a power transmission apparatus for transmitting power to a power reception apparatus including a power reception coil in a non-contact manner, including:

a power transmission coil that is disposed within the power transmission apparatus opposite an installation surface of the power transmission apparatus, the power reception apparatus being installed on the installation surface, the power transmission apparatus being capable of being electromagnetically coupled with the power reception coil;

at least one position detection coil that is disposed between the installation surface and the power transmission coil and that detects a signal from the power reception coil of the power reception apparatus installed on the installation surface;

a position detection circuit that determines that the power reception apparatus is installed on the installation surface if a voltage or a current of the signal detected via the at least one position detection coil is smaller than a reference value;

a reception circuit that demodulates into a data signal a wireless signal transmitted from the power reception apparatus to the power transmission apparatus via the at least one position detection coil;

a switch circuit that switches between first electrical connection of the at least one position detection coil to the position detection circuit, and second electrical connection of the at least one position detection coil to the reception circuit; and a power transmission control circuit that switches from the first electrical connection to the second electrical connection if the position detection circuit has determined that the voltage or the current of the signal detected via the at least one position detection coil has been smaller than the reference value for a predetermined period, and that causes the reception circuit to receive the wireless signal via the at least one position detection coil.

According to the above-described aspect, the power transmission apparatus receives the above-described apparatus information and number-and-position information from the power reception apparatus via the position detection coil used for detecting that the power reception apparatus is installed on the installation surface of the power transmission apparatus. Accordingly, when receiving the apparatus information and number-and-position information, the power transmission apparatus uses the position detection coil instead of using the power transmission coil for transmitting high AC power. As a result, it is possible to suppress a decrease in the signal intensity, compared with when the transmission coil is used for receiving the apparatus information and number-and-position information.

When receiving the apparatus information and number-and-position information, the power transmission apparatus uses the position detection coil instead of using the power transmission coil for transmitting high AC power. Accordingly, the apparatus information and number-and-position information received from the power reception apparatus is distinguishable from noise of power transmitted from the power transmission apparatus.

An existing component, that is, the position detection coil used for detecting that the power reception apparatus is installed on the installation surface of the power transmission apparatus, is used without adding a new communication device, thereby reducing the size and the thickness of the power transmission apparatus and the power reception apparatus.

It is thus possible to provide a small, thin power transmission apparatus that receives communication from a power reception apparatus more reliably.

In the above-described aspect, for example, the at least one position detection coil may include a plurality of position detection coils, and the power transmission control circuit may cause the reception circuit to receive the wireless signal via all of the plurality of position detection coils.

With this configuration, by the provision of the plurality of position detection coils, it is possible to detect in a wider range that the power reception apparatus is installed on the installation surface of the power transmission apparatus.

In the above-described aspect, for example, the power transmission control circuit may determine a position of the power reception apparatus installed on the installation surface by comparing the intensity of the voltage or the current of the signal with the intensity of a voltage or a current of another signal subsequent to the signal or by comparing the impedance of the voltage or the current of the signal with the impedance of a voltage or a current of another signal subsequent to the signal.

With this configuration, as a parameter for determining the position of the power reception apparatus installed on the installation surface, a parameter other than the voltage or the current of the signal, that is, the impedance of the voltage or the current of the signal, is used, thereby making it possible to determine the position of the power reception apparatus in various manners.

In the above-described aspect, for example, the power transmission apparatus may further include: a DC power supply source; and a power transmission circuit that converts a DC voltage supplied from the DC power supply source into an AC voltage, and the power transmission coil may be connected to the power transmission circuit.

With this configuration, the position detection coil is disposed between the installation surface and the power transmission coil, and is connected to the DC power supply source via the reception circuit, the power transmission control circuit, and the power transmission circuit. Thus, the position detection coil is not directly connected to the DC power supply source. As a result, when receiving the apparatus information and number-and-position information from the power reception apparatus via the position detection coil, the reception circuit is not vulnerable to the influence of noise from the DC power supply source.

In the above-described aspect, for example, the power transmission apparatus may further include a transmission circuit that transmits a different wireless signal, which is different from the wireless signal transmitted from the power reception apparatus, to the power reception apparatus. The transmission circuit may be connected to the position detection coil and transmit the different wireless signal to the power reception apparatus via the position detection coil.

With this configuration, since the power transmission apparatus transmits the different wireless signal by using the position detection coil instead of the transmission coil, the different wireless signal transmitted from the transmission circuit is distinguishable from noise of power transmitted from the power transmission apparatus. Additionally, the transmission circuit transmits a wireless signal, which is different from the wireless signal transmitted from the power reception apparatus, to the power reception apparatus, thereby preventing the interference of a wireless signal transmitted from the power reception apparatus and a wireless signal transmitted from the transmission circuit. These two wireless signals are different from each other in, for example, the frequency or the signal waveform.

In the above-described aspect, for example, the frequency of the wireless signal transmitted from the power reception apparatus to the power transmission apparatus may be set to be different from the frequency used for transmitting power from the power transmission apparatus in a non-contact manner.

It is now assumed that receiving of the wireless signal by the reception circuit and transmitting of AC power from the power transmission apparatus to the power reception apparatus are performed at the same time. In this case, if the frequency of the wireless signal is the same as the frequency of AC power, the AC power signal and the wireless signal may not be distinguished from each other since both signals are input into the reception circuit. With the above-described configuration, the frequency of the wireless signal transmitted from the power reception apparatus to the power transmission apparatus is different from that of the AC power signal transmitted from the power transmission apparatus in a non-contact manner, thereby preventing the interference of these two signals in the reception circuit.

The above-described aspect may be implemented by a wireless power transmission system.

(Power Transmission Apparatus According to Second Aspect of the Present Disclosure)

A power transmission apparatus according to a second aspect of the disclosure is a power transmission apparatus for transmitting power to one or more power reception apparatuses each including a power reception coil in a non-contact manner, including:

a power transmission coil that is disposed within the power transmission apparatus opposite an installation surface of the power transmission apparatus, the one or more power reception apparatuses are installed on the installation surface, the power transmission apparatus being capable of being electromagnetically coupled with the power reception coil;

a plurality of position detection coils that are disposed side by side between the installation surface and the power transmission coil, and that detect each signal from each the power reception coil included in the one or more power reception apparatuses installed on the installation surface;

a position detection circuit that receives, from each of the plurality of position detection coils, voltages or currents of the signals detected by each of the plurality of position detection coils;

a power transmission control circuit that determines a position of the one or more power reception apparatuses installed on the installation surface by comparing the voltages or the currents of the signals;

a reception circuit that demodulates into a data signal a wireless signal transmitted from the one or more power reception apparatuses to the power transmission apparatus and that outputs the data signal to the power transmission control circuit; and a switch circuit that switches between electrical connection of each of the plurality of position detection coils to the position detection circuit, and electrical connection of each of the plurality of position detection coils to the reception circuit, wherein, if the power transmission control circuit determines that the one or more power reception apparatuses are installed at the determined position of the one or more power reception apparatuses installed on the installation surface for a predetermined time, the power transmission control circuit switches the electrical connection of a position detection coil corresponding to the determined position of the one or more power reception apparatuses from the position detection circuit to the reception circuit, and causes the reception circuit to receive the wireless signal via the position detection coil.

According to the above-described aspect, the power transmission apparatus receives the above-described apparatus information and number-and-position information from the power reception apparatus via the position detection coil used for detecting that the one or more power reception apparatuses are installed on the installation surface of the power transmission apparatus. Accordingly, when receiving the apparatus information and number-and-position information, the power transmission apparatus uses the position detection coil instead of using the power transmission coil for transmitting high AC power. As a result, it is possible to suppress a decrease in the signal intensity, compared with when the transmission coil is used when receiving the apparatus information and number-and-position information.

The apparatus information and number-and-position information is received by using, from among the plurality of position detection coils, a position detection coil corresponding to the position of the power reception apparatus installed on the installation surface. Accordingly, since the apparatus information and number-and-position information is received by using the position detection coil which will receive the highest signal intensity among the plurality of position detection coils, correct information reception is implemented.

An existing component, that is, the position detection coils used for detecting that the one or more power reception apparatuses are installed on the installation surface of the power transmission apparatus, is used without adding a new communication device, thereby reducing the size and the thickness of the power transmission apparatus and the one or more power reception apparatuses.

In the above-described aspect, for example, the power transmission control circuit may determine the position of the one or more power reception apparatuses installed on the installation surface by comparing the intensities of the voltages or the currents of the signals or by comparing the impedances of the voltages or the currents of the signals.

With this configuration, as a parameter for determining the position of the one or more power reception apparatuses installed on the installation surface, a parameter other than the voltages or the currents of the signals, that is, the impedances of the voltages or the currents of the signals, are used, thereby making it possible to determine the position of the one or more power reception apparatuses in various manners.

In the above-described aspect, for example, the power transmission apparatus may further include: a DC power supply source; and a power transmission circuit that converts a DC voltage supplied from the DC power supply source into an AC voltage. The power transmission coil may be connected to the power transmission circuit.

With this configuration, the position detection coil is disposed between the installation surface and the power transmission coil, and is connected to the DC power supply source via the reception circuit, the power transmission control circuit, and the power transmission circuit. Thus, the position detection coil is not directly connected to the DC power supply source. As a result, when receiving the apparatus information and number-and-position information from the one or more power reception apparatuses via the position detection coil, the reception circuit is not vulnerable to the influence of noise from the DC power supply source.

In the above-described aspect, for example, the power transmission apparatus may further include a transmission circuit that transmits a different wireless signal, which is different from the wireless signal transmitted from the one or more power reception apparatuses, to the one or more power reception apparatuses. The transmission circuit may be connected to a position detection coil and transmits the different wireless signal to the power reception apparatus via the position detection coil.

In the above-described aspect, for example, the frequency of the wireless signal transmitted from the one or more power reception apparatuses to the power transmission apparatus may be set to be different from the frequency used for transmitting AC power from the power transmission apparatus in a non-contact manner.

It is now assumed that receiving of the wireless signal by the reception circuit and transmitting of AC power from the power transmission apparatus to the power reception apparatus are performed at the same time. In this case, if the frequency of the wireless signal is the same as the frequency of AC power, the AC power signal and the wireless signal may not be distinguished from each other since both signals are input into the reception circuit. With the above-described configuration, the frequency of the wireless signal transmitted from the power reception apparatus to the power transmission apparatus is different from that of the AC power signal transmitted from the power transmission apparatus in a non-contact manner, thereby preventing the interference of the two signals in the reception circuit.

In the above-described aspect, for example, the one or more power reception apparatuses may be a plurality of power reception apparatuses. The plurality of power reception apparatuses may be installed on the installation surface. A plurality of wireless signals transmitted from the plurality of power reception apparatuses and received by the power transmission apparatus may have different frequencies from each other.

With this configuration, the interference of a plurality of wireless signals received by the reception circuit may be reduced, thereby suppressing a decrease in the intensity of the wireless signals.

The above-described aspect may be implemented by a wireless power transmission system.

(Power Transmission Apparatus According to Third Aspect of the Present Disclosure)

A power transmission apparatus according to one mode of a third aspect of the disclosure is a power transmission apparatus for transmitting AC power to a power reception apparatus including a power reception coil in a non-contact manner, including:

a power transmission coil that is capable of being electromagnetically coupled with the power reception coil;

a position detection coil that is disposed between the power transmission coil and the power reception coil and that detects a position of the power reception coil;

a position detection circuit that specifies the position of the power reception coil by using the position detection coil;

a power transmission circuit that supplies AC power to the power transmission coil;

a power transmission control circuit that controls AC power to be supplied from the power transmission circuit to the power reception apparatus; and a reception circuit that demodulates a wireless signal transmitted from the power reception apparatus into a data signal, wherein the position detection coil receives a wireless signal transmitted from the power reception apparatus and outputs the wireless signal to the reception circuit, and the power transmission control circuit controls power transmission by determining an amount of power to be supplied to the power reception apparatus on the basis of the data signal demodulated by the reception circuit.

A power transmission apparatus according to another mode of the third aspect of the disclosure is a power transmission apparatus for transmitting AC power to a plurality of power reception apparatuses each including a power reception coil in a non-contact manner, including:

a power transmission coil that is capable of being electromagnetically coupled with the power reception coils;

a position detection coil that is disposed between the power transmission coil and the power reception coil of each of the plurality of power reception apparatuses and that detects a position of the power reception coil of each of the plurality of power reception apparatuses;

a position detection circuit that detects the number and positions of power reception coils by using the position detection coil;

a power transmission circuit that supplies AC power to the power transmission coil;

a power transmission control circuit that controls AC power to be supplied from the power transmission circuit to the plurality of power reception apparatuses;

a plural-terminal control circuit that performs control concerning the plurality of power reception apparatuses; and a reception circuit that demodulates a wireless signal transmitted from each of the plurality of power reception apparatuses into a data signal, wherein the position detection coil receives a wireless signal transmitted from each of the plurality of power reception apparatuses and outputs the wireless signal to the reception circuit, the plural-terminal control circuit determines an amount of power to be supplied to each of the power reception apparatuses on the basis of information concerning the number and positions of the power reception coils detected by the position detection circuit and the data signal demodulated by the reception circuit, and outputs the determined amount of power to the power transmission control circuit, and the power transmission control circuit controls the amount of power to be supplied to each of the power reception apparatuses on the basis of the determined amount of power.

In the above-described aspect, for example, the position detection coil may be disposed along a surface on which the power transmission apparatus opposes the power reception apparatus and in an area closer to the power reception coil than to the power transmission coil.

In the above-described aspect, for example, the position detection coil may include a plurality of position detection coil elements.

In the above-described aspect, for example, the power transmission coil may include a plurality of power transmission coil elements.

In the above-described aspect, for example, the power transmission coil may be configured such that a power transmission coil element is movable along a rail by using a motor.

In the above-described aspect, for example, the power transmission apparatus may further include a switch circuit that selectively connects the position detection coil to one of the position detection circuit and the reception circuit.

In the above-described aspect, for example, the power transmission apparatus may further include a transmission circuit that transmits a different wireless signal to the power reception apparatus.

In the above-described aspect, for example, the transmission circuit may be connected to the position detection coil and may transmit the different wireless signal to the power reception apparatus via the position detection coil.

In the above-described aspect, for example, the transmission circuit may be connected to the power transmission coil and may transmit the different wireless signal to the power reception apparatus via the power transmission coil.

In the above-described aspect, for example, the frequency of the wireless signal transmitted from the power reception apparatus to the power transmission apparatus may be set to be different from the frequency used for transmitting AC power from the power transmission apparatus in a non-contact manner.

In the above-described aspect, for example, a plurality of wireless signals transmitted from the plurality of power reception apparatuses and received by the power transmission apparatus may have different frequencies from each other.

In the above-described aspect, for example, the position detection circuit may detect the positions of the power reception coils by using a predetermined wireless signal, and may set one of the plurality of wireless signals having different frequencies to be a frequency close to the frequency of the predetermined wireless signal for detecting the positions of the power reception coils and may set another frequency of the plurality of wireless signals to be a power transmission frequency of AC power.

In the above-described aspect, for example, the power transmission apparatus may include a plurality of power transmission circuits for transmitting AC power to the plurality of respective power reception apparatuses in a non-contact manner.

The above-described aspect may be implemented by a wireless power transmission system.

A power transmission apparatus and a wireless power transmission system according to an embodiment of the disclosure are suitably used for reliably detecting a metallic foreign substance disposed near a power transmission coil or a power reception coil when transmitting AC power to a mobile device or an electric vehicle (EV) in a non-contact manner.

What is claimed is:

1. A power transmission apparatus comprising:
    a power transmission coil that transmits power wirelessly to a power reception apparatus including a power reception coil, the power transmission coil being capable of being electromagnetically coupled with the power reception coil;
    a position detection coil that detects a signal from the power reception coil;
    a position detection circuit that determines a position of the power reception apparatus when a voltage or a current of the signal detected via the position detection coil is smaller than a reference value;
    a reception circuit that demodulates a wireless signal received from the power reception apparatus via the position detection coil;
    a switch circuit that switches between first electrical connection of the position detection coil to the position detection circuit, and second electrical connection of the position detection coil to the reception circuit; and
    a power transmission control circuit that switches from the first electrical connection to the second electrical connection when the position detection circuit has determined that the voltage or the current of the signal detected via the position detection coil has been smaller than the reference value for a predetermined period, and that causes the reception circuit to receive the wireless signal via the position detection coil.

2. The power transmission apparatus according to claim 1, wherein the power transmission control circuit determines a position of the power reception apparatus by comparing the intensity of the voltage or the current of the signal with the intensity of a voltage or a current of another signal subsequent to the signal or by comparing the impedance of the voltage or the current of the signal with the impedance of a voltage or a current of another signal subsequent to the signal.

3. The power transmission apparatus according to claim 1, further comprising:
    a direct current power supply source; and
    a power transmission circuit that converts a direct current voltage supplied from the direct current power supply source into an alternating current voltage,
    wherein the power transmission coil is connected to the power transmission circuit.

4. The power transmission apparatus according to claim 1, further comprising:
    a transmission circuit that transmits a different wireless signal, which is different from the wireless signal transmitted from the power reception apparatus,
    wherein the transmission circuit is connected to the position detection coil and transmits the different wireless signal to the power reception apparatus via the position detection coil.

5. The power transmission apparatus according to claim 1, wherein a frequency of the wireless signal transmitted from the power reception apparatus is different from a frequency of the power transmitted wirelessly from the power transmission apparatus.

6. The power transmission apparatus according to claim 1, wherein
    the power transmission coil is disposed opposite to an installation surface of the power transmission apparatus, the power reception apparatus being installed on the installation surface, the position detection coil is disposed between the installation surface and the power transmission coil.

7. A wireless power transmission system comprising:
    the power transmission apparatus according to claim 1; and
    the power reception apparatus.

* * * * *